United States Patent [19]
Nakadate et al.

[11] Patent Number: 5,934,421
[45] Date of Patent: Aug. 10, 1999

[54] DAMPING FORCE CONTROL TYPE HYDRAULIC SHOCK ABSORBER

[75] Inventors: Takao Nakadate; Akira Kashiwagi, both of Kanagawa-ken; Takashi Nezu, Tokyo; Naoki Makita, Kanagawa-ken, all of Japan

[73] Assignee: Tokico Ltd., Kawasaki, Japan

[21] Appl. No.: 08/763,954

[22] Filed: Dec. 11, 1996

[30] Foreign Application Priority Data

Dec. 20, 1995 [JP] Japan ................................. 7-349254
Jun. 7, 1996 [JP] Japan ................................. 8-168395
Oct. 4, 1996 [JP] Japan ................................. 8-283114

[51] Int. Cl.$^6$ ..................................................... F16F 9/46
[52] U.S. Cl. .................. 188/299.1; 188/318; 188/322.13
[58] Field of Search ................................. 188/299.1, 279, 188/280, 282.5, 282.6, 297, 317, 318, 322.11, 322.13, 322.19, 320; 280/707, 709, 714

[56] References Cited

U.S. PATENT DOCUMENTS

| 4,484,669 | 11/1984 | Kato ........................................ 188/282.5 |
| 4,819,773 | 4/1989 | Ito et al. ................................. 188/282.5 |
| 5,328,004 | 7/1994 | Fannin et al. ............................ 188/318 |
| 5,649,611 | 7/1997 | Nakadate .............................. 188/322.13 |
| 5,655,633 | 8/1997 | Nakadate et al. . |

FOREIGN PATENT DOCUMENTS 195 18 560
  A1 11/1995 Germany .
62-155242 10/1987 Japan .

Primary Examiner—Robert J. Oberleitner
Assistant Examiner—Pamela J. Lipka
Attorney, Agent, or Firm—Wenderoth, Lind & Ponack, L.L.P.

[57] ABSTRACT

In a damping force control type hydraulic shock absorber, the flow path area of a port is changed by moving a spool according to an electric current supplied to an actuator, and thus the flow path area of a passage between cylinder upper and lower chambers is directly changed, thereby controlling orifice characteristics. Moreover, the pressure in a pilot chamber is changed according to the resulting pressure loss so as to change the valve opening pressure of a disk valve, thereby controlling valve characteristics. This enables the damping force characteristic control range to be widened. The pilot chamber is formed by the side wall of a valve member, the disk valve, a seal disk, and a seal member, also, the seal member has no sliding portion. It is therefore possible to minimize the leakage of hydraulic fluid and to obtain stable damping force characteristics. It is also possible to minimize variations in damping force with temperature changes.

19 Claims, 16 Drawing Sheets

DAMPING FORCE CONTROL TYPE HYDRAULIC SHOCK ABSORBER

BACKGROUND OF THE INVENTION

The present invention relates to a damping force control type hydraulic shock absorber attached to a suspension system of a vehicle, for example, an automobile.

Hydraulic shock absorbers attached to suspension systems of automobiles or other vehicles include damping force control type hydraulic shock absorbers which are arranged such that the level of damping force can be properly controlled in accordance with the road surface conditions, vehicle running conditions, etc., with a view to improving the ride quality and the steering stability.

In general, this type of hydraulic shock absorber includes a cylinder having a hydraulic fluid sealed therein. A piston, which has a piston rod connected thereto to constitute a piston assembly, is slidably fitted in the cylinder to divide the inside of the cylinder into two chambers. The piston assembly is provided with a main hydraulic fluid passage and a bypass passage, which provide communication between the two chambers in the cylinder. The main hydraulic fluid passage is provided with a damping force generating mechanism including an orifice and a disk valve. The bypass passage is provided with a damping force control valve for controlling the flow path area of the bypass passage. It should be noted that a reservoir is connected through a base valve to one of the chambers in the cylinder to compensate for a volumetric change in the cylinder due to extension and contraction of the piston rod by the compression and expansion of a gas sealed in the reservoir.

With the above arrangement, when the bypass passage is opened through the damping force control valve, the flow resistance to the hydraulic fluid flowing between the two chambers in the cylinder is reduced, thereby reducing damping force. When the bypass passage is closed, the flow resistance between the two chambers is increased, thereby increasing damping force. Thus, damping force characteristics can be properly controlled by opening and closing the damping force control valve.

However, the above-described arrangement, in which damping force is controlled by changing the flow path area of the bypass passage, suffers from the problem that although the damping force characteristics can be changed to a considerable extent in a low piston speed region because damping force depends on the orifice area of the bypass passage, the damping force characteristics cannot greatly be changed in intermediate and high piston speed regions because in these regions damping force depends on the damping force generating mechanism (disk valve, etc.) of the main hydraulic fluid passage.

To solve the above problem, there has heretofore been proposed a damping force control type hydraulic shock absorber in which a pressure chamber is formed at the back of a main valve serving as a damping force generating mechanism in a main hydraulic fluid passage provided in a piston assembly, and the pressure chamber is communicated with a cylinder chamber on the upstream side of the main valve through a fixed orifice and also communicated with a cylinder chamber on the downstream side of the main valve through a variable orifice, as disclosed, for example, in Japanese Utility Model Application Public Disclosure (KOKAI) No. 62-155242.

According to the above damping force control type hydraulic shock absorber, the flow path area of the passage between the two chambers in the cylinder can be controlled by opening and closing the variable orifice, and the valve opening initial pressure of the main valve can be changed by changing the pressure in the pressure chamber. Thus, it is possible to control orifice characteristics (in which damping force is approximately proportional to the square of the piston speed) and valve characteristics (in which damping force is approximately proportional to the piston speed), and hence possible to widen the control range for damping force characteristics.

In the above-described damping force control type hydraulic shock absorber, however, the pressure chamber is formed by slidably fitting the main valve to a valve guide. Therefore, there is leakage of hydraulic fluid from the area of sliding contact between the valve guide and the main valve. This makes it difficult to obtain stable damping force. In particular, leakage from the area of the sliding contact is greatly influenced by the change in viscosity of hydraulic fluid with temperature. Therefore, variations in damping force due to temperature changes are undesirably large. Further, machining of the sliding portions requires high machining accuracy, resulting in a high production cost.

SUMMARY OF THE INVENTION

In view of the above-described circumstances, an object of the present invention is to provide a damping force control type hydraulic shock absorber having a wide control range for damping force characteristics and capable of obtaining a stable damping force.

The present invention is applicable to a damping force control type hydraulic shock absorber including a cylinder having a hydraulic fluid sealed therein. A piston is slidably fitted in the cylinder. A piston rod is connected at one end thereof to the piston. The other end of the piston rod extends as far as the outside of the cylinder. A main passage allows the hydraulic fluid to flow therethrough in response to sliding motion of the piston. A main damping valve is provided in the main passage to control the flow path area of the main passage. A pilot chamber is provided at the back of a valve body of the main damping valve to apply the pressure in pilot chamber in a direction for closing the valve body. An upstream passage communicates the pilot chamber with a part of the main passage which is upstream of the main damping valve. A fixed orifice is provided in the upstream passage. A downstream passage communicates the pilot chamber with a part of the main passage which is downstream of the main damping valve. A variable orifice is provided in the downstream passage to control the flow path area of the downstream passage. According to the present invention, the damping force control type hydraulic shock absorber is provided with a valve member in the shape of a cylinder, one end of which is closed. A hydraulic fluid passage axially extends through the bottom of the valve member. An annular inner seal portion projects from the inner wall of the bottom of the valve member at a position radially inward of the hydraulic fluid passage. An annular valve seat projects from the inner wall of the bottom of the valve member at a position radially outward of the hydraulic fluid passage. An annular outer seal portion projects from the inner wall of the bottom of the valve member at a position radially outward of the valve seat. A groove opens in the inner wall between the valve seat and the outer seal portion. A disk valve is secured at an inner peripheral portion thereof to the inner seal portion and abuts at an outer peripheral portion thereof on the valve seat. An annular seal disk abuts at an inner peripheral portion thereof on the back of the disk valve and also abuts at an outer peripheral portion thereof on the outer seal portion. A spring device presses the seal disk against the disk valve and the outer seal portion. A seal member is fitted in an open end portion of the valve member. The hydraulic fluid passage and the groove constitute the main passage. The disk valve constitutes the valve body of the main damping valve. The side wall of the valve member, the disk valve, the seal disk, and the seal member define the pilot chamber.

By virtue of the above-described arrangement, the flow path area of the passage between the cylinder upper and lower chambers is directly changed by changing the flow path area of the downstream passage through the variable orifice, thereby controlling damping force characteristics (orifice characteristics). Moreover, damping valve opening characteristics are changed by changing the pressure in the pilot chamber according to the pressure loss due to the variable orifice, thereby controlling damping force characteristics (valve characteristics). Further, because the pilot chamber is formed without providing a sliding portion, it is possible to minimize the leakage of hydraulic fluid from the pilot chamber. Furthermore, because the inner seal portion, valve seat and outer seal portion of the valve member can be integrally formed, it is possible to minimize errors in the projection height of these portions.

DETAILED DESCRIPTION OF THE PREFERRED EMBODIMENTS

Embodiments of the present invention will be described below in detail with reference to the accompanying drawings.

Figure 1:
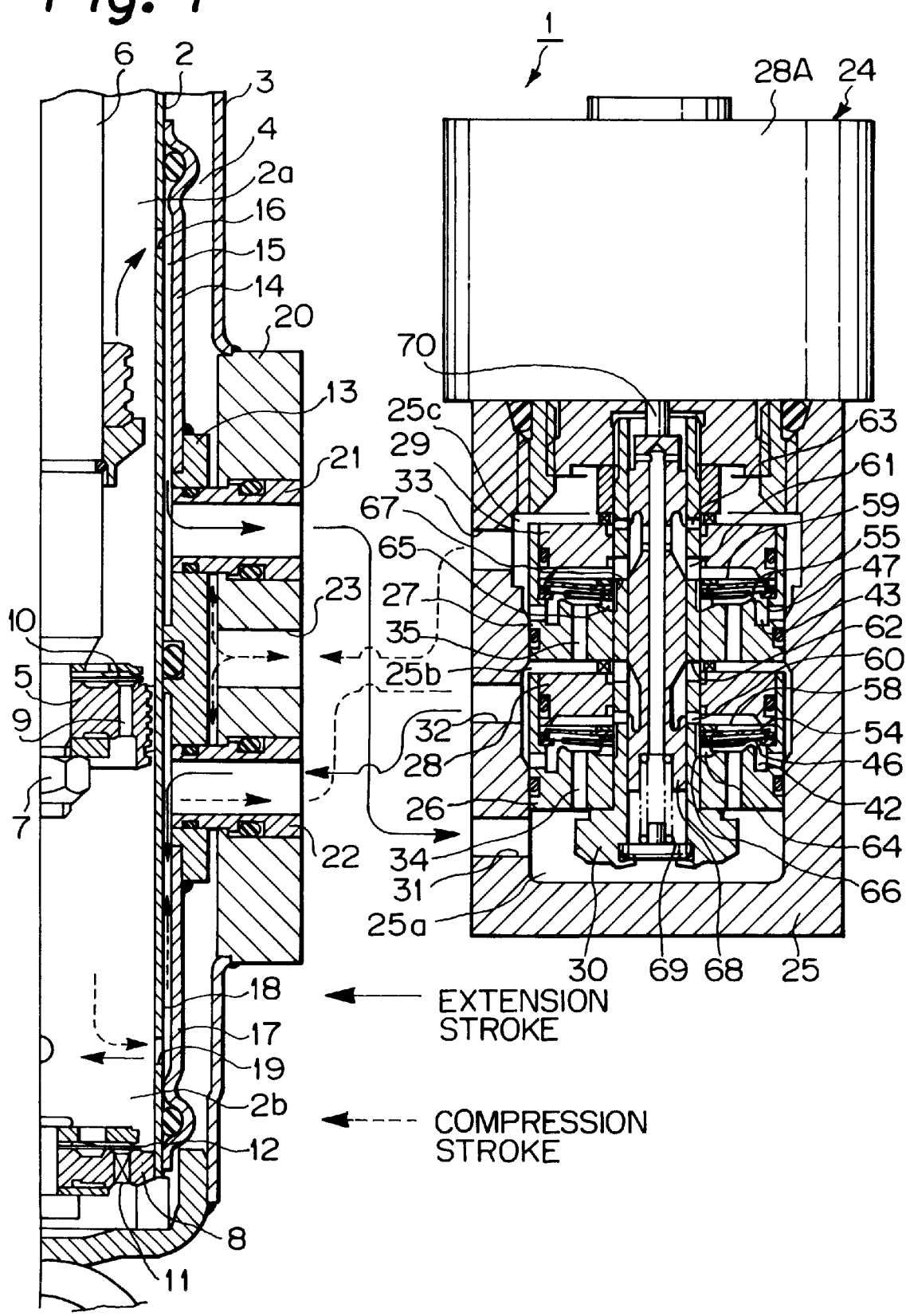
FIG. 1 is a vertical sectional view showing an essential part of a first embodiment of the present invention.
Figure 2:
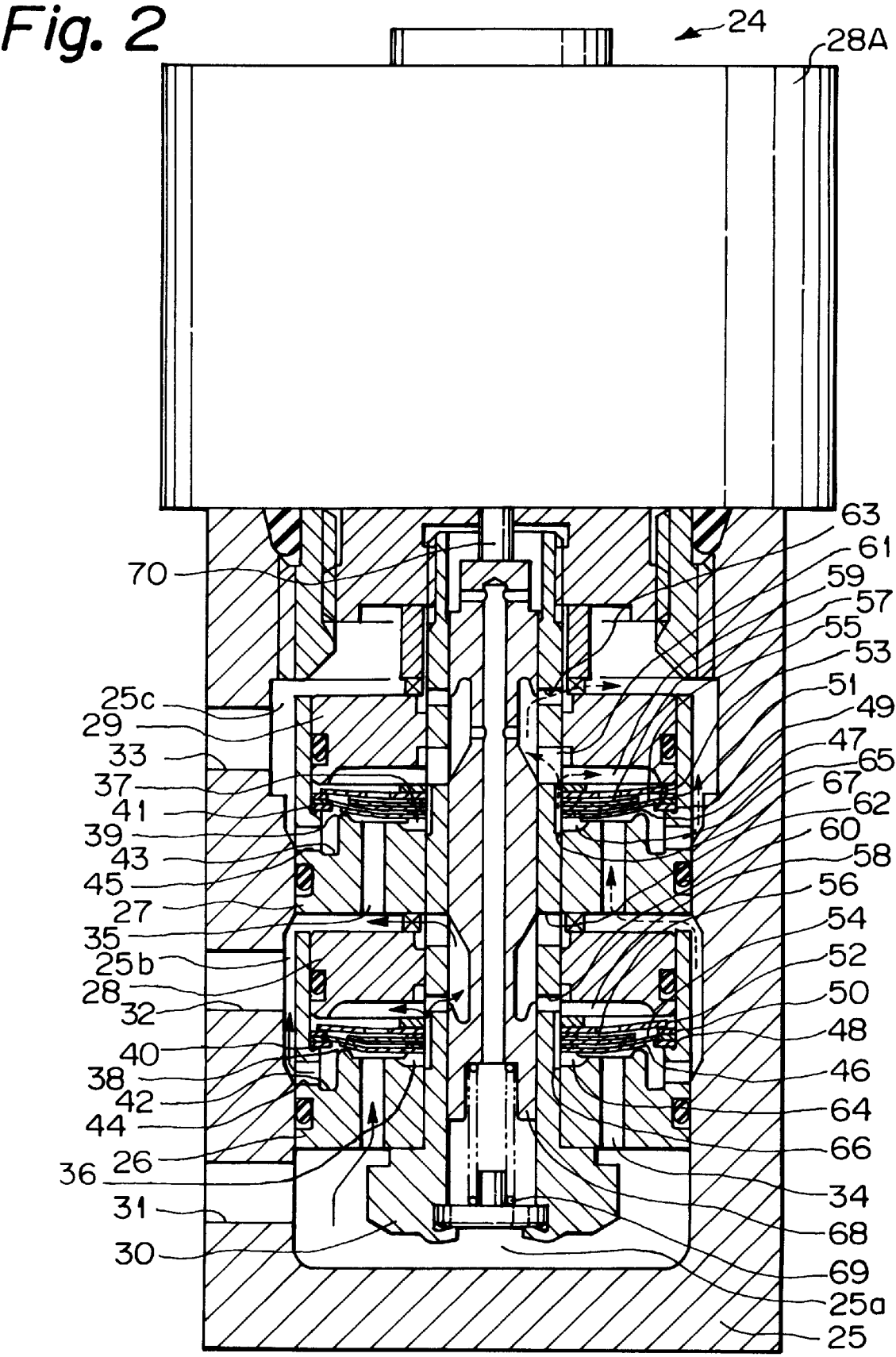
FIG. 2 is an enlarged view of a damping force generating mechanism in FIG. 1.

A first embodiment of the present invention will be described with reference to FIGS. 1 and 2. As shown in FIGS. 1 and 2, a damping force control type hydraulic shock absorber 1 has a double cylinder structure comprising a cylinder 2 and an outer cylinder 3 provided outside the cylinder 2. A reservoir chamber 4 is formed between the cylinder 2 and the outer cylinder 3. A piston 5 is slidably fitted in the cylinder 2. The piston 5 divides the inside of the cylinder 2 into two chambers, that is, a cylinder upper chamber 2a and a cylinder lower chamber 2b. One end of a piston rod 6 is connected to the piston 5 by a nut 7. The other end portion of the piston rod 6 extends through the cylinder upper chamber 2a and through a rod guide and seal member (not shown), which are fitted to the upper end portion of the outer cylinder 3, and projects to the outside of the cylinder 2. The lower end portion of the cylinder 2 is provided with a base valve 8 which divides the cylinder lower chamber 2b and the reservoir chamber 4 from each other. The cylinder 2 has a hydraulic fluid sealed therein, and the reservoir chamber 4 has a hydraulic fluid and gas sealed therein.

The piston 5 is provided with a hydraulic fluid passage 9 for providing communication between the cylinder upper and lower chambers 2a and 2b, and a check valve 10 for allowing flow of hydraulic fluid through the hydraulic fluid passage 9 from the cylinder lower chamber 2b toward the cylinder upper chamber 2a. The base valve 8 is provided with a hydraulic fluid passage 11 for providing communication between the cylinder lower chamber 2b and the reservoir chamber 4, and a check valve 12 for allowing flow of hydraulic fluid through the hydraulic fluid passage 11 from the reservoir chamber 4 toward the cylinder lower chamber 2b.

An approximately cylindrical passage member 13 is fitted on the outer periphery of a central part of the cylinder 2. An upper tube 14 is fitted on the outer periphery of an upper part of the cylinder 2 and connected to the passage member 13. The upper tube 14 forms an annular hydraulic fluid passage 15 between it and the cylinder 2. The annular hydraulic fluid passage 15 is communicated with the cylinder upper chamber 2a through a hydraulic fluid passage 16 provided in the side wall of the cylinder 2 near the upper end of the cylinder 2. A lower tube 17 is fitted on the outer periphery of a lower part of the cylinder 2 and connected to the passage member 13. The lower tube 17 forms an annular hydraulic fluid passage 18 between it and the cylinder 2. The annular hydraulic fluid passage 18 is communicated with the cylinder lower chamber 2b through a hydraulic fluid passage 19 provided in the side wall of the cylinder 2 near the lower end of the cylinder 2. A connecting plate 20 is secured to the outer cylinder 3 so as to face the passage member 13.

Connecting pipes 21 and 22 are fitted into the connecting plate 20 and the passage member 13. The connecting pipe 21 communicates with the annular hydraulic fluid passage 15. The connecting pipe 22 communicates with the annular hydraulic fluid passage 18. Further, the connecting plate 20 is provided with a connecting hole 23 communicating with the reservoir chamber 4. A damping force generating mechanism 24 is connected to the connecting plate 20.

The damping force generating mechanism 24 has a casing 25 in the shape of a cylinder, one end of which is closed. Two valve members 26 and 27 are fitted in the casing 25. The valve members 26 and 27 are each in the shape of a cylinder, one end of which is closed. A proportional solenoid actuator 28A (hereinafter referred to as "actuator 28A") is secured to the open end of the casing 25 by thread engagement. The inside of the casing 25 is divided into three hydraulic fluid chambers 25a, 25b and 25c by the valve members 26 and 27. Annular seal members 28 and 29 are fitted into the respective open end portions of the valve members 26 and 27. The seal members 28 and 29 are pierced with an approximately cylindrical guide member 30. The distal end of the guide member 30 is secured to the actuator 28A by thread engagement. Thus, the valve members 26 and 27 are secured together with these members. The side wall of the casing 25 is provided with connecting holes 31, 32 and 33 communicating with the hydraulic fluid chambers 25a, 25b and 25c, respectively. The connecting holes 31, 32 and 33 are connected to the connecting pipe 21, the connecting pipe 22, and the connecting hole 23, respectively, which are provided in the connecting plate 20.

The bottoms of the valve members 26 and 27 are provided with a plurality (only two of them are shown) of circumferentially spaced, axially extending hydraulic fluid passages 34 and 35 (main passages), respectively. Annular inner seal portions 36 and 37 project from the inner walls of the bottoms of the valve members 26 and 27 at respective positions radially inward of the hydraulic fluid passages 34 and 35. Annular valve seats 38 and 39 project from the inner walls of the bottoms of the valve members 26 and 27 at respective positions radially outward of the hydraulic fluid passages 34 and 35. Further, annular outer seal portions 40 and 41 project from the inner walls of the bottoms of the valve members 26 and 27 at respective positions radially outward of the valve seats 38 and 39 and near the side walls of the valve members 26 and 27. Annular grooves 42 and 43 (main passages) are formed, respectively, between the valve seats 38 and 39 and the outer seal portions 40 and 41. The grooves 42 and 43 are communicated with the hydraulic fluid chambers 25b and 25c through hydraulic fluid passages 44 and 45, respectively.

The valve members 26 and 27 are provided with disk valves 46 and 47 (valve bodies of main damping valves), respectively. Inner peripheral portions of the disk valves 46 and 47 are secured to the inner seal portions 36 and 37, respectively, and outer peripheral portions of the disk valves 46 and 47 abut on the valve seats 38 and 39, respectively. Annular seal rings 48 and 49 (outer seal portions) are fitted into the valve members 26 and 27, respectively, so as to abut on the outer seal portions 40 and 41. Retainer rings 50 and 51 (each comprising two rings in the illustrated example) are stacked on the seal rings 48 and 49, respectively. The retainer rings 50 and 51 have a larger inner diameter than the seal rings 48 and 49. Further, disk-shaped plate springs 52 and 53 are secured to the valve members 26 and 27, respectively, in such a manner that inner peripheral portions of the plate springs 52 and 53 are secured to the guide member 30, and outer peripheral portions of the plate springs 52 and 53 abut on the retainer rings 50 and 51. Annular seal disks 54 and 55 abut at inner peripheral portions thereof on the respective backs of the disk valves 46 and 47. The seal disks 54 and 55 have outer peripheral portions inserted into the stacks of the retainer rings 50 and 51 so as to abut on the inner peripheral portions of the seal rings 48 and 49, respectively. In other words, the seal disks 54 and 55 are in contact with the outer seal portions 40 and 41 through the seal rings 48 and 49, respectively. The seal disks 54 and 55 are pressed toward the disk valves 46 and 47 and the seal rings 48 and 49 by disk-shaped valve springs 56 and 57 (spring means). The valve springs 56 and 57 are secured at inner peripheral portions thereof to the guide member 30, with their outer peripheral portions abutting on the seal disks 54 and 55, respectively. Thus, pilot chambers 58 and 59 are respectively defined by the side walls of the valve members 26 and 27, the disk valves 46 and 47, the seal disks 54 and 55, and the seal members 28 and 29.

The side wall of the guide member 30 is provided with ports 60 and 61 communicating with the pilot chambers 58 and 59, respectively, and ports 62 and 63 communicating with the hydraulic fluid chambers 25b and 25c, respectively. The inner seal portions 36 and 37 of the valve members 26 and 27 are provided with cut portions 64 and 65 (fixed orifices). The cut portions 64 and 65 are communicated with the ports 60 and 61, that is, the pilot chambers 58 and 59, through grooves 66 and 67 (upstream passages) provided in the outer peripheral portion of the guide member 30. Further, a spool 68 is slidably fitted in the guide member 30 to control the flow path areas of passages between the ports 60 and 62 and the ports 61 and 63. The spool 68 is biased toward the actuator 28A by a compression spring 69. Thus, the orifice areas of the ports 60 and 63 (downstream passage and variable orifice) can be controlled by moving the spool 68 through an actuating rod 70 of the actuator 28A against the biasing force from the spring 69.

The operation of this embodiment, arranged as described above, will be described below. In FIGS. 1 and 2, the solid line arrows show the flow of hydraulic fluid during the extension stroke of the piston rod 6, and the dashed-line arrows show the flow of hydraulic fluid during the contraction stroke of the piston rod 6.

During the extension stroke of the piston rod 6, as the piston 5 moves, the piston check valve 10 is closed, and the hydraulic fluid on the cylinder upper chamber side is pressurized. Consequently, the hydraulic fluid flows, as shown by the solid line arrows in the figures, through the hydraulic fluid passage 16, the annular hydraulic fluid passage 15 and the connecting pipe 21 to the connecting hole 31 of the damping force generating mechanism 24. The hydraulic fluid further flows from the connecting hole 31 to the cylinder lower chamber 2b through the hydraulic fluid chamber 25a, the hydraulic fluid passage 34, the cut portion 64, the groove 66, the port 60, the port 62, the hydraulic fluid chamber 25b, the connecting hole 32, the connecting pipe 22, the annular hydraulic fluid passage 18, and the hydraulic fluid passage 19. When the pressure on the cylinder upper chamber side reaches the valve opening pressure of the disk valve 46 during the extension stroke, the disk valve 46 opens to allow the hydraulic fluid to flow directly from the hydraulic fluid chamber 25a to the hydraulic fluid chamber 25b through the hydraulic fluid passage 34, the groove 42, and the hydraulic fluid passage 44. Meanwhile, an amount of hydraulic fluid corresponding to an amount by which the piston rod 6 withdraws from the cylinder 2 flows from the reservoir chamber 4 to the cylinder lower chamber 2b while opening the check valve 12 of the base valve 8.

Accordingly, during the extension stroke, when the piston speed is low before the disk valve 46 opens, damping force of orifice characteristics is generated according to the flow path area of a passage formed by the cut portion 64, the groove 66 and the port 60. As the piston speed increases, the pressure on the cylinder upper chamber side rises, and eventually the disk valve 46 opens. After the disk valve 46 has opened, damping force of valve characteristics is generated according to the degree of opening of the disk valve 46. Thus, an excessive increase of damping force is suppressed.

Damping force is controlled by changing the flow path area of the port 60 through the movement of the spool 68 caused by energizing the actuator 28A. In this case, as the flow path area of the port 60 reduces, the pressure loss due to the port 60 increases, and the pressure in the pilot chamber 58, which is upstream the port 60, becomes higher. Consequently, the valve opening pressure of the disk valve 46 becomes higher. Conversely, as the flow path area of the port 60 increases, the pressure loss due to the port 60 is reduced, and the pressure in the pilot chamber 58, which is upstream of the port 60, is reduced. Consequently, the valve opening pressure of the disk valve 46 becomes lower. Thus, by changing the flow path area of the port 60, the valve opening pressure of the disk valve 46 is changed, and both orifice and valve characteristics change. Accordingly, damping force characteristics can be controlled over a wide piston speed range, from a low piston speed region to a high piston speed region.

During the compression or contraction stroke, as the piston 5 moves, the check valve 10 of the piston 5 opens to allow the hydraulic fluid in the cylinder lower chamber 2b to flow directly to the cylinder upper chamber 2a through the hydraulic fluid passage 9. As a result, the pressures in the cylinder upper and lower chambers 2a and 2b become approximately the same. Therefore, there is no flow of hydraulic fluid between the connecting holes 31 and 32 of the damping force generating mechanism 24. Meanwhile, as the piston rod 6 enters the cylinder 2, the check valve 12 of the base valve 8 is closed, and the hydraulic fluid in the cylinder 2 is pressurized correspondingly to an amount by which the piston rod 6 enters the cylinder 2. Consequently, the hydraulic fluid flows, as shown by the dashed-line arrows in the figures, from the cylinder lower chamber 2b to the connecting hole 32 of the damping force generating mechanism 24 through the hydraulic fluid passage 19, the annular hydraulic fluid passage 18 and the connecting pipe 22, and further flows from the connecting hole 32 to the reservoir chamber 4 through the hydraulic fluid chamber 25b, the hydraulic fluid passage 35, the cut portion 65, the groove 67, the port 61, the port 63, the hydraulic fluid chamber 25c, the connecting hole 33 and the connecting hole 23. When the pressure on the cylinder side reaches the valve opening pressure of the disk valve 47 during the contraction stroke, the disk valve 47 opens to allow the hydraulic fluid to flow directly from the hydraulic fluid chamber 25b to the hydraulic fluid chamber 25c through the hydraulic fluid passage 35, the groove 43, and the hydraulic fluid passage 45.

Thus, during the contraction stroke, when the piston speed is low before the disk valve 47 opens, damping force of orifice characteristics is generated according to the flow path area of a passage formed by the cut portion 65, the groove 67 and the port 63. As the piston speed increases, the pressure on the cylinder side rises, and eventually the disk valve 47 opens. After the disk valve 47 has opened, damping force of valve characteristics is generated according to the degree of opening of the disk valve 47. Thus, an excessive increase of damping force is suppressed.

The orifice characteristics are controlled by changing the flow path area of the port 63 through the movement of the spool 68, and the valve opening pressure of the disk valve 47 is changed by changing the pressure in the pilot chamber 59 through the pressure loss due to the port 63, thereby controlling the valve characteristics, as in the case of the above-described extension stroke. Accordingly, damping force characteristics can be controlled over a wide piston speed range, from a low piston speed region to a high piston speed region.

It should be noted that the damping force characteristics can be controlled for each of the extension and contraction strokes by arranging the ports 60 and 63 so that the flow path area of each of the ports 60 and 63 is changed by the movement of the spool 68. For instance, if the ports 60 and 63 and the land of the spool 68 are arranged so that the flow path areas of the ports 60 and 63 change according to the position of the spool 68 during the extension and contraction strokes in such a manner that when the flow path area of one of the ports 60 and 63 is large, that of the other is small, and vice versa, it is possible to select a combination of different damping force characteristics for the extension and contraction strokes (e.g. a combination of "hard" characteristics for the extension stroke and "soft" characteristics for the contraction side, and vice versa).

Further, because the pilot chambers 58 and 59 are formed without providing a sliding portion, it is possible to minimize the leakage of hydraulic fluid from the pilot chambers 58 and 59 and hence it is possible to obtain stable damping force characteristics. Moreover, it is possible to minimize variations in damping force with temperature changes. Further, there is no need of machining a sliding portion, which requires high machining accuracy. Accordingly, the production cost can be reduced. Further, because the inner seal portions 36 and 37, the valve seats 38 and 39, and the outer seal portions 40 and 41 can be integrally formed with the valve members 26 and 27, it is possible to reduce errors in the height of these portions, and hence possible to minimize variations in the valve opening pressure of the disk valves 46 and 47.

Although in the above-described embodiment the seal rings 48 and 49 are arranged to abut on the outer seal portions 40 and 41 of the valve members 26 and 27, respectively, and the seal disks 54 and 55 are arranged to abut on the seal rings 48 and 49, respectively, it should be noted that the seal disks 54 and 55 may be arranged to abut directly on the outer seal portions 40 and 41, respectively, with the seal rings 48 and 49 omitted.

Next, a second embodiment of the present invention will be described with reference to FIGS. 3 and 4. It should be noted that the arrangement of the second embodiment is approximately similar to that of the first embodiment except for the bottom-side seal structure and valve spring structure of the valve member in each pilot chamber of the damping force generating mechanism. Therefore, only the damping force generating mechanism according the second embodiment is illustrated in FIGS. 3 and 4, in which the same members or portions as those shown in FIGS. 1 and 2 are denoted by the same reference numerals, and only portions in which the second embodiment differs from the first embodiment will be described below in detail.

Figure 3:
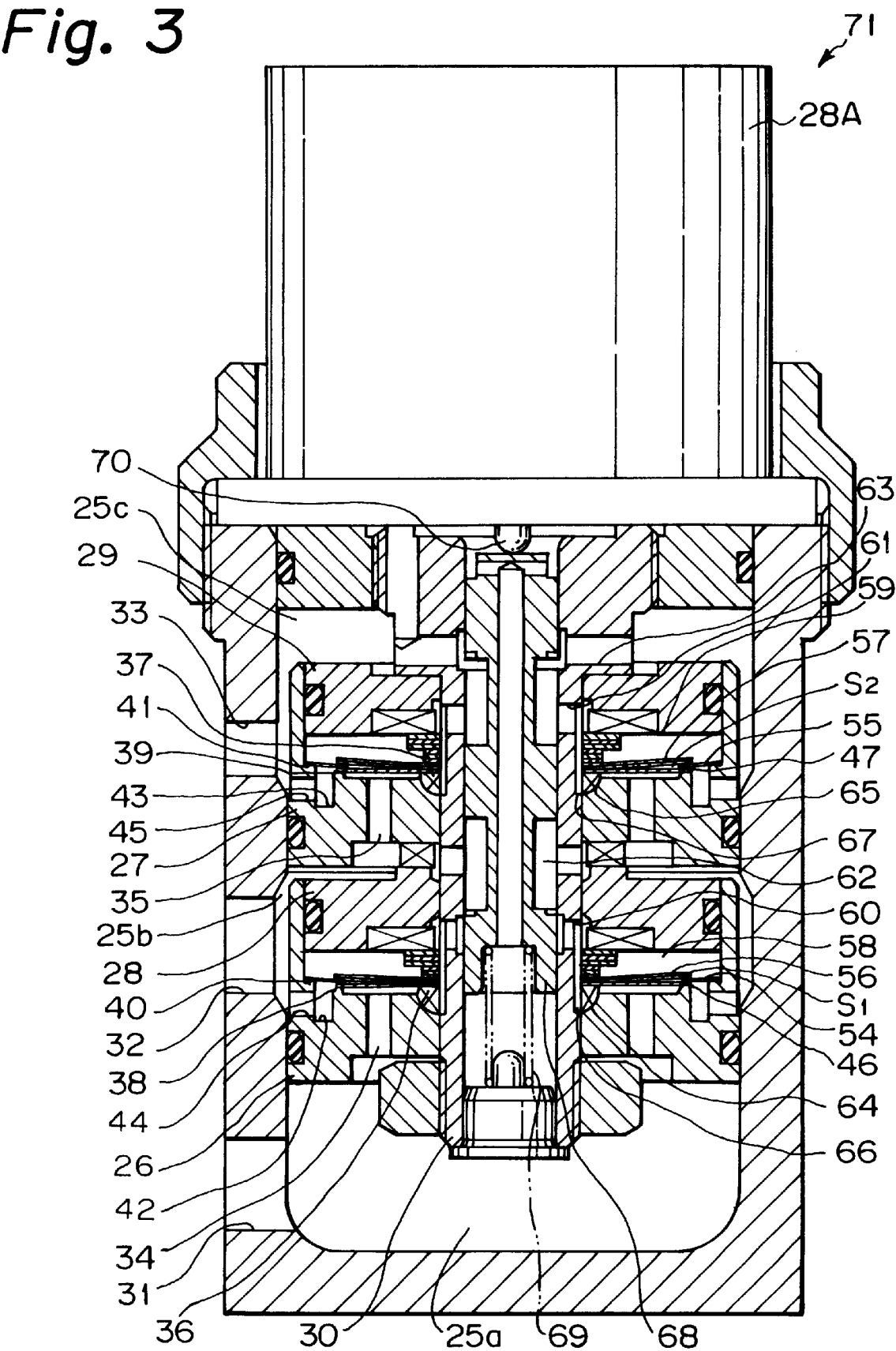
FIG. 3 is a vertical sectional view of a damping force generating mechanism in a damping force control type hydraulic shock absorber according to a second embodiment of the present invention.
Figure 4:
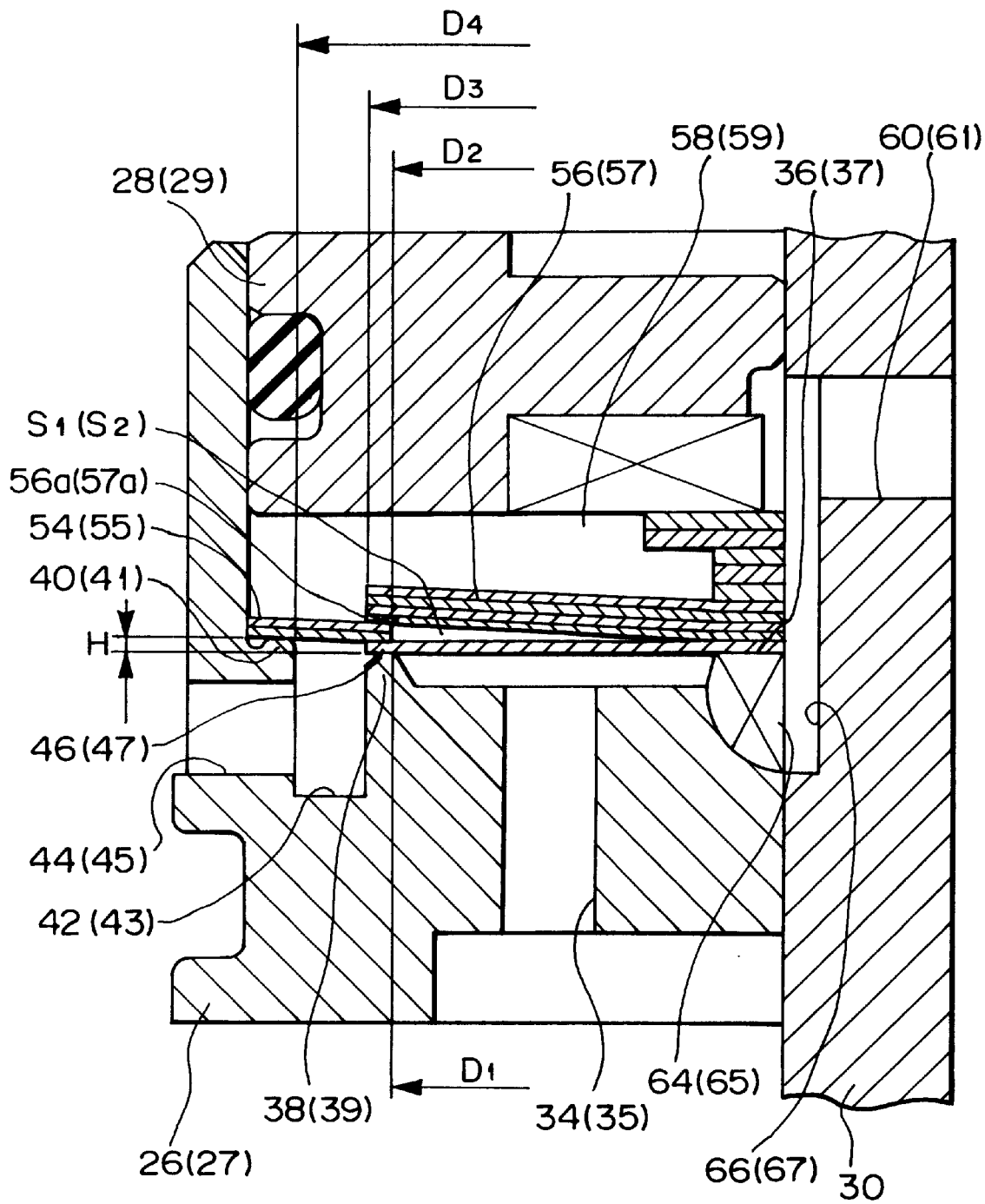
FIG. 4 is an enlarged view showing a part including a main damping valve and a pilot chamber in FIG. 3.

As shown in FIGS. 3 and 4, in the damping force generating mechanism 71 according to the second embodiment, the seal rings 48 and 49, the retainer rings 50 and 51, and the plate springs 52 and 53 in the damping force generating mechanism 24 according to the first embodiment, shown in FIGS. 1 and 2, are omitted, and the seal disks 54 and 55 are arranged to abut directly on the outer seal portions 40 and 41, respectively. Moreover, cut portions 56a and 57a (hydraulic fluid passages) are formed in the respective outer peripheral portions of the disk-shaped valve springs 56 and 57 (plate springs). The cut portion 56a provides communication between the pilot chamber 58 and a space $S_1$ formed between the disk valve 46, the seal disk 54, and the valve spring 56. Similarly, the cut portion 57a provides communication between the pilot chamber 59 and a space $S_2$ formed between the disk valve 47, the seal disk 55, and the valve spring 57.

By virtue of the above-described arrangement, the spaces $S_1$ and $S_2$ and the pilot chambers 58 and 59 are in communication with each other through the cut portions 56a and 57a, respectively. Consequently, the pressure in the space $S_1$ and the pressure in the pilot chamber 58 are always the same, and the pressure in the space $S_2$ and the pressure in the pilot chamber 59 are also always the same. Accordingly, there is no possibility of the spaces $S_1$ and $S_2$ being crushed when the pressures in the pilot chambers 58 and 59 increase, and it is therefore possible to prevent the increase in friction produced between the abutting portions of the valve springs 56 and 57, the seal disks 54 and 55, and the disk valves 46 and 47 by the compression of the spaces $S_1$ and $S_2$. Thus, it is possible to enable the disk valves 46 and 47 to operate smoothly and to obtain stable damping force. Moreover, during the assembly of the damping force control type hydraulic shock absorber, the spaces $S_1$ and $S_2$ can be evacuated of air through the cut portions 56a and 57a. Therefore, the removal of air can be readily effected. It should be noted that the valve springs 56 and 57 may be provided with through-holes, respectively, in place of the cut portions 56a and 57a as hydraulic fluid passages for communication between the spaces $S_1$ and $S_2$ and the pilot chambers 58 and 59.

Next, a third embodiment of the present invention will be described with reference to FIGS. 5 and 6. It should be noted that the arrangement of the third embodiment is approximately similar to that of the second embodiment except the structure of hydraulic fluid passages constituting upstream passages that communicate with the pilot chambers 58 and 59 of the damping force generating mechanism. Therefore, only the damping force generating mechanism is illustrated in FIGS. 5 and 6, in which the same members or portions as those shown in FIGS. 3 and 4 are denoted by the same reference numerals, and only portions in which the third embodiment differs from the second embodiment will be described below in detail.

Figure 5:
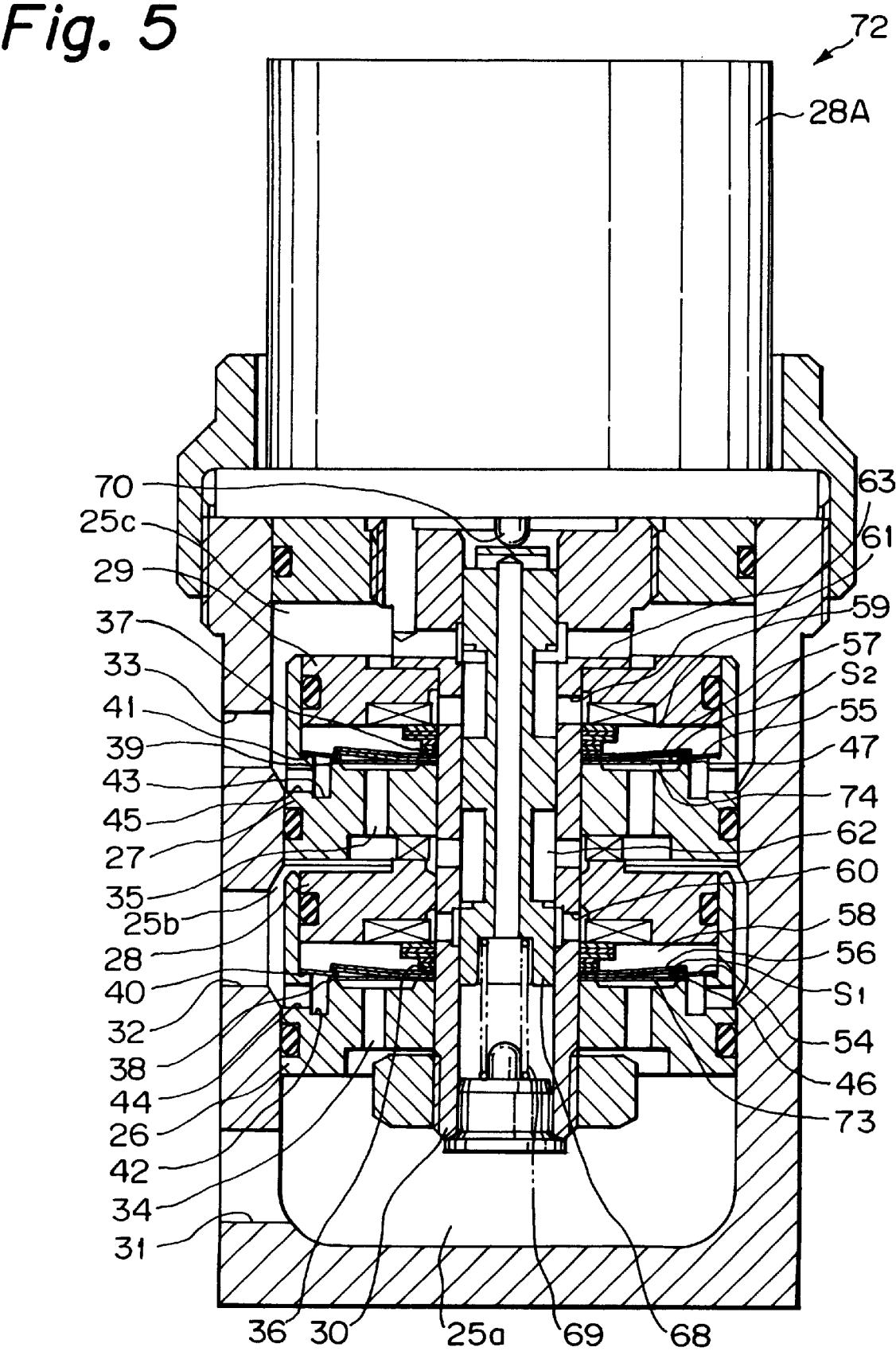
FIG. 5 is a vertical sectional view of a damping force generating mechanism in a damping force control type hydraulic shock absorber according to a third embodiment of the present invention.
Figure 6:
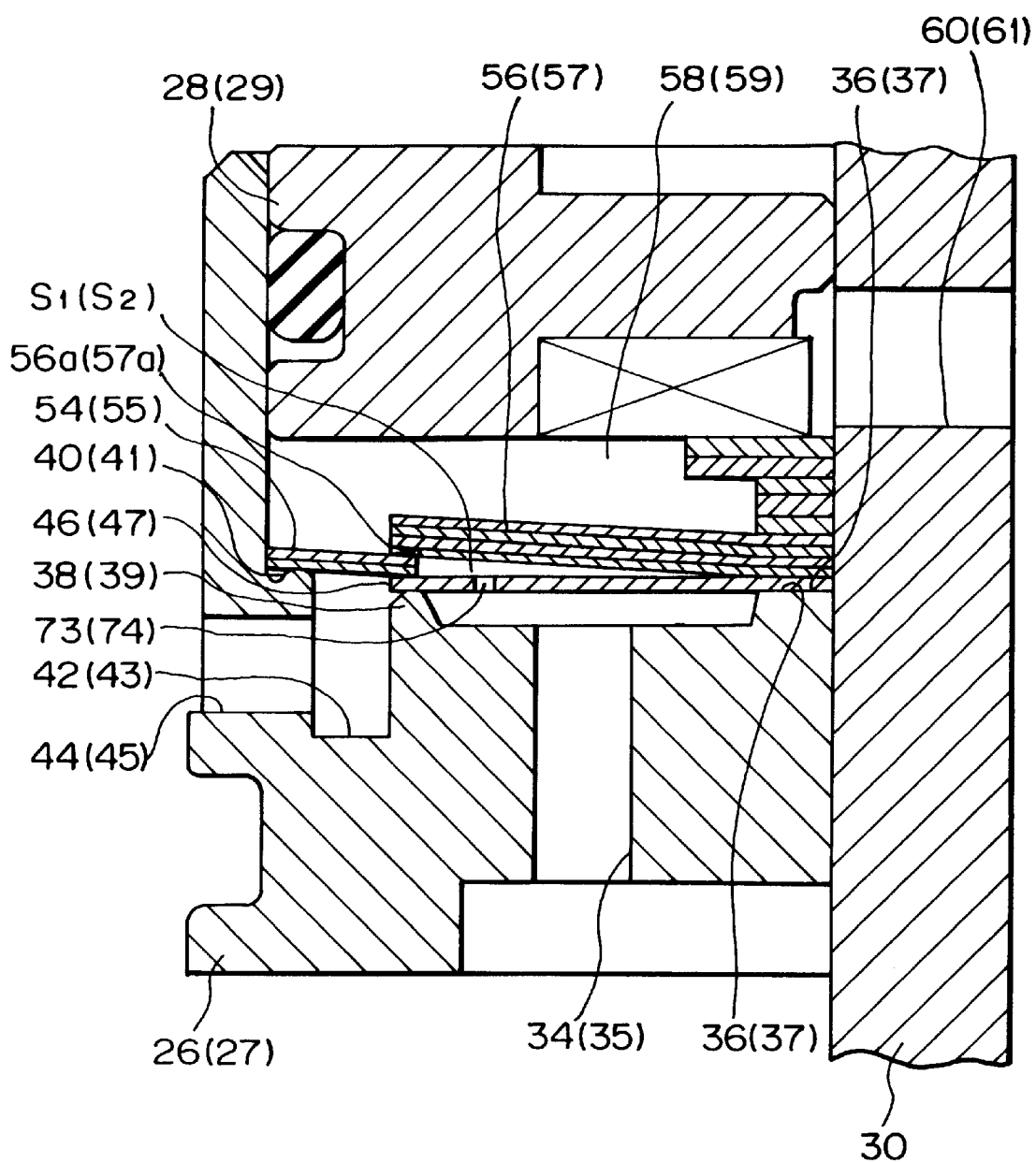
FIG. 6 is an enlarged view showing a part including a main damping valve and a pilot chamber in FIG. 5.

As shown in FIGS. 5 and 6, in the damping force generating mechanism 72 according to the third embodiment, the cut portions 64 and 65, which are provided in the inner seal portions 36 and 37 of the valve members, and the grooves 66 and 67, which are provided in the guide member 30, are omitted, but instead, orifice passages 73 and 74 (fixed orifices) are provided in the disk valves 46 and 47 to provide communication between the hydraulic fluid passages 34 and 35 and the spaces S, and S2, respectively. The cut portions 56a and 57a of the valve springs 56 and 57, the spaces $S_1$ and $S_2$, and the orifice passages 73 and 74 constitute upstream passages, respectively, which provide communication between the pilot chambers 58 and 59 and the upstream sides of the disk valves 46 and 47.

By virtue of the above-described arrangement, the hydraulic fluid can be made to flow from the hydraulic fluid passages 34 and 35 to the pilot chambers 58 and 59 through the orifice passages 73 and 74, and it is possible to provide the same function and advantageous effects as those in the first and second embodiments. Further, because the orifice passages 73 and 74 allow the hydraulic fluid to flow directly between the spaces $S_1$ and $S_2$ and the pilot chambers 58 and 59, the hydraulic fluid can flow smoothly between the spaces $S_1$ and $S_2$ and the pilot chambers 58 and 59, and it is therefore possible to facilitate the removal of air during the assembly of the damping force control type hydraulic shock absorber. Moreover, upstream passages and fixed orifices can be readily formed simply by punching the disk valves in comparison to a case where cut portions and grooves are formed in the valve members and the guide member to provide upstream passages and fixed orifices. The setting of damping force characteristics can be easily changed by changing the diameters of the orifice passages 73 and 74.

Although in this embodiment the orifice passages 73 and 74 of the disk valves 46 and 47 are used as fixed orifices of the upstream passages, the cut portions 56a and 57a of the valve springs 56 and 57 may be used as fixed orifices. It is also possible to use both the orifice passages 73 and 74 and the cut portions 56a and 57a as fixed orifices.

Next a fourth embodiment of the present invention will be described with reference to FIGS. 7 to 9. It should be noted that the arrangement of the fourth embodiment is approximately similar to that of the third embodiment except that sub-damping valves are provided upstream the fixed orifices of the damping force generating mechanism. Therefore, only the damping force generating mechanism is illustrated in FIGS. 7 and 8, in which the same members or portions as those shown in FIGS. 5 and 6 are denoted by the same reference numerals, and only portions in which the fourth embodiment differs from the third embodiment will be described below in detail.

Figure 7:
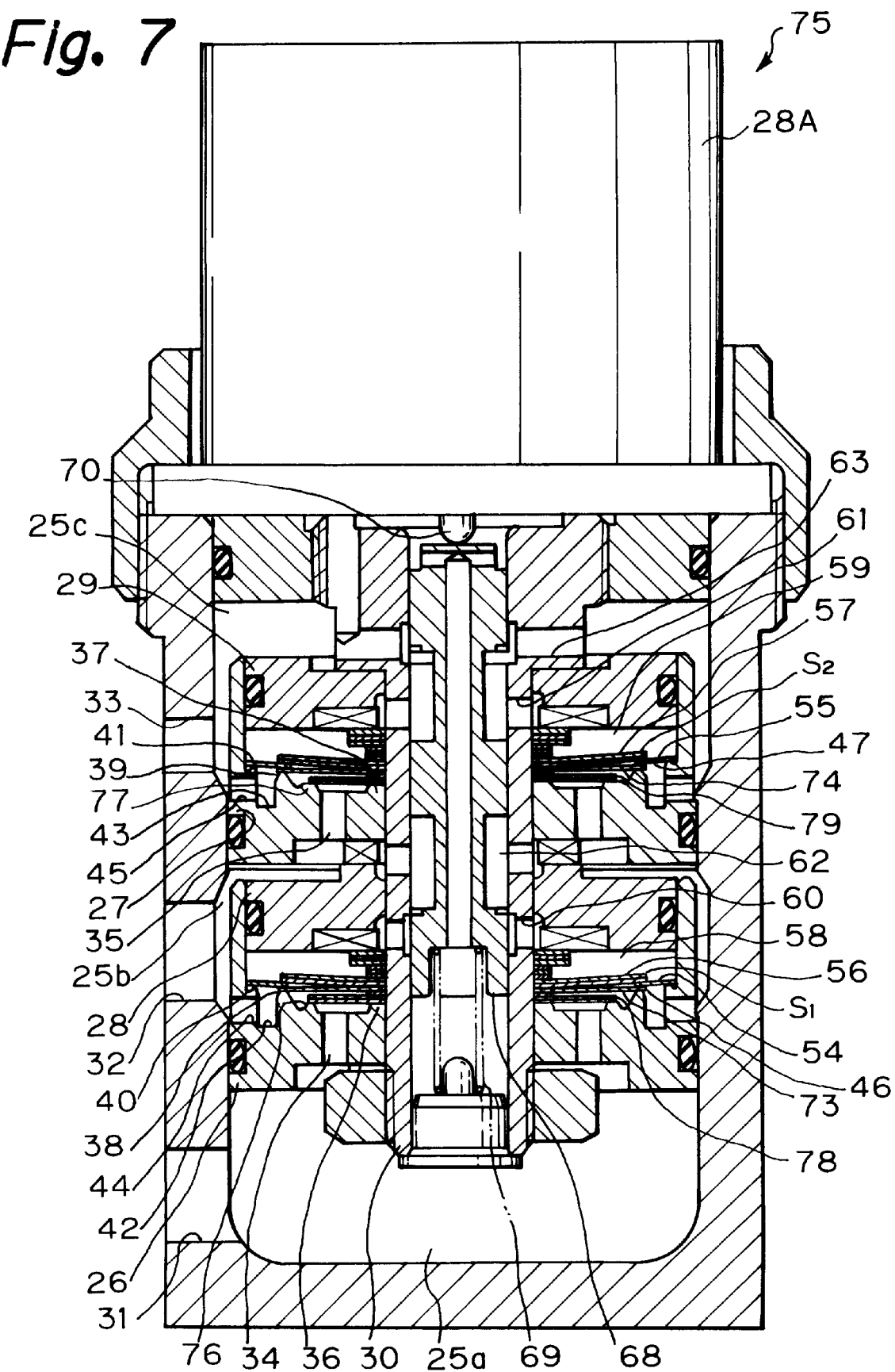
FIG. 7 is a vertical sectional view of a damping force generating mechanism in a damping force control type hydraulic shock absorber according to a fourth embodiment of the present invention.
Figure 8:
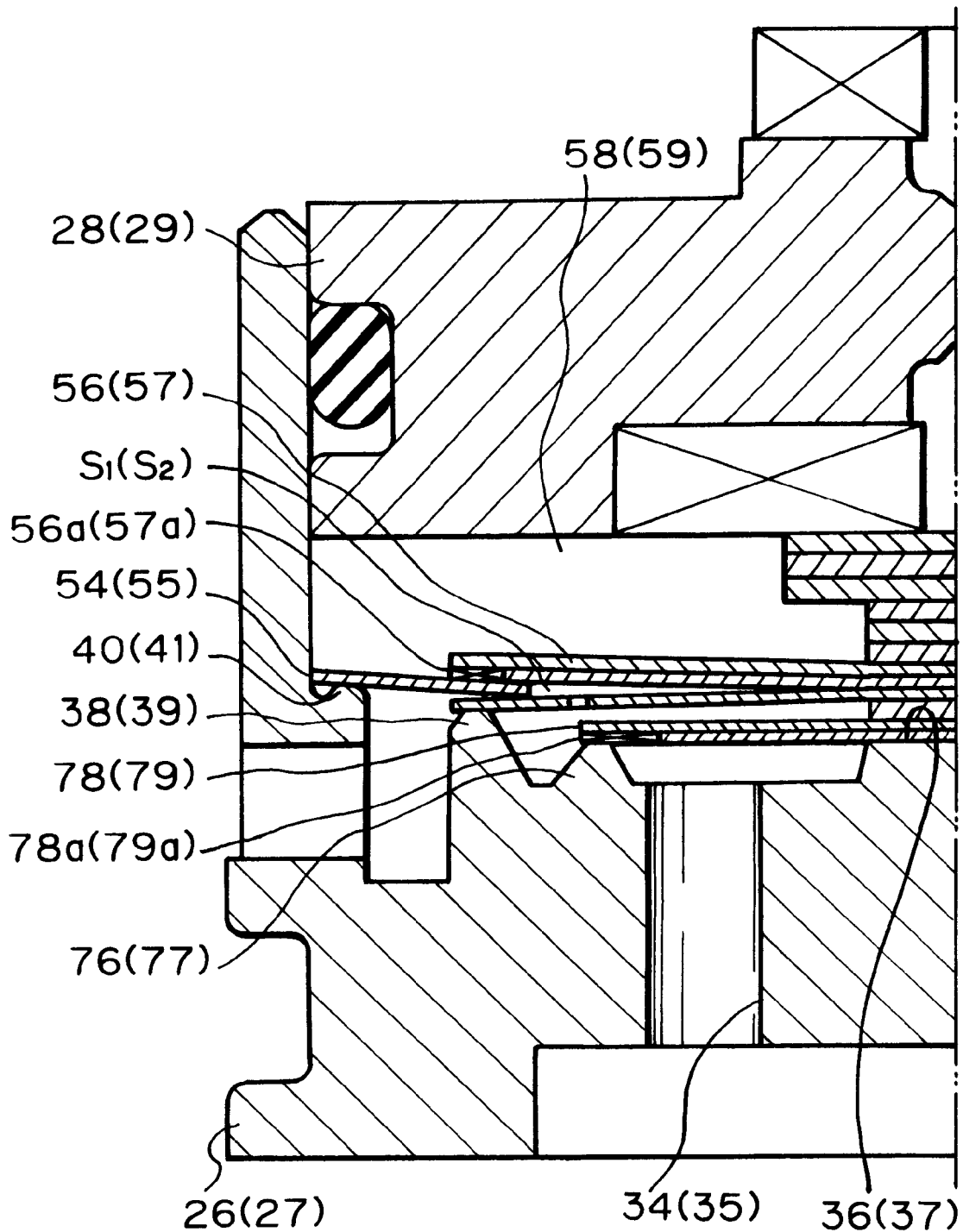
FIG. 8 is an enlarged view showing a part including a main damping valve, a sub-damping valve, and a pilot chamber in FIG. 7.

As shown in FIGS. 7 and 8, in the damping force generating mechanism 75 according to the fourth embodiment, annular valve seats 76 and 77 project from the inner walls of the bottoms of the valve members 26 and 27 at respective positions radially inward of the valve seats 38 and 39 such that the valve seats 76 and 77 are lower than the valve seats 38 and 39 in terms of the projection height. The damping force generating mechanism 75 is further provided with sub-disk valves 78 and 79 (sub-damping valves) which are secured at inner peripheral portions thereof to the inner seal portions 36 and 37 together with the disk valves 46 and 47, and whose outer peripheral portions rest on the valve seats 76 and 77, respectively. The sub-disk valves 78 and 79 deflect to open upon receiving the hydraulic fluid chamber (25a and 25b) side pressure in the hydraulic fluid passages 34 and 35. Thus, damping force of valve characteristics is generated according to the degree of opening of the sub-disk valves 78 and 79. Cut portions 78a and 79a are provided in the outer peripheral portions of the sub-disk valves 78 and 79 to form orifice passages which always allow flow of hydraulic fluid in the hydraulic fluid passages 34 and 35. It should be noted that the valve opening pressures of the sub-disk valves 78 and 79 are set at levels sufficiently lower than the valve opening pressures of the disk valves 46 and 47.

The above-described arrangement provides the same function and advantageous effects as those in the third embodiment. In addition, during the extension and contraction strokes of the piston rod 6, when the piston speed is in an extremely low speed region before the disk valves 46 and 47 open (low piston speed region), damping force of orifice characteristics is generated by the orifice passages formed by the cut portions 78a and 79a of the sub-disk valves 78 and 79. As the piston speed increases, the sub-disk valves 78 and 79 open, and damping force of valve characteristics is generated according to the degree of opening of the sub-disk valves 78 and 79.

Figure 9:
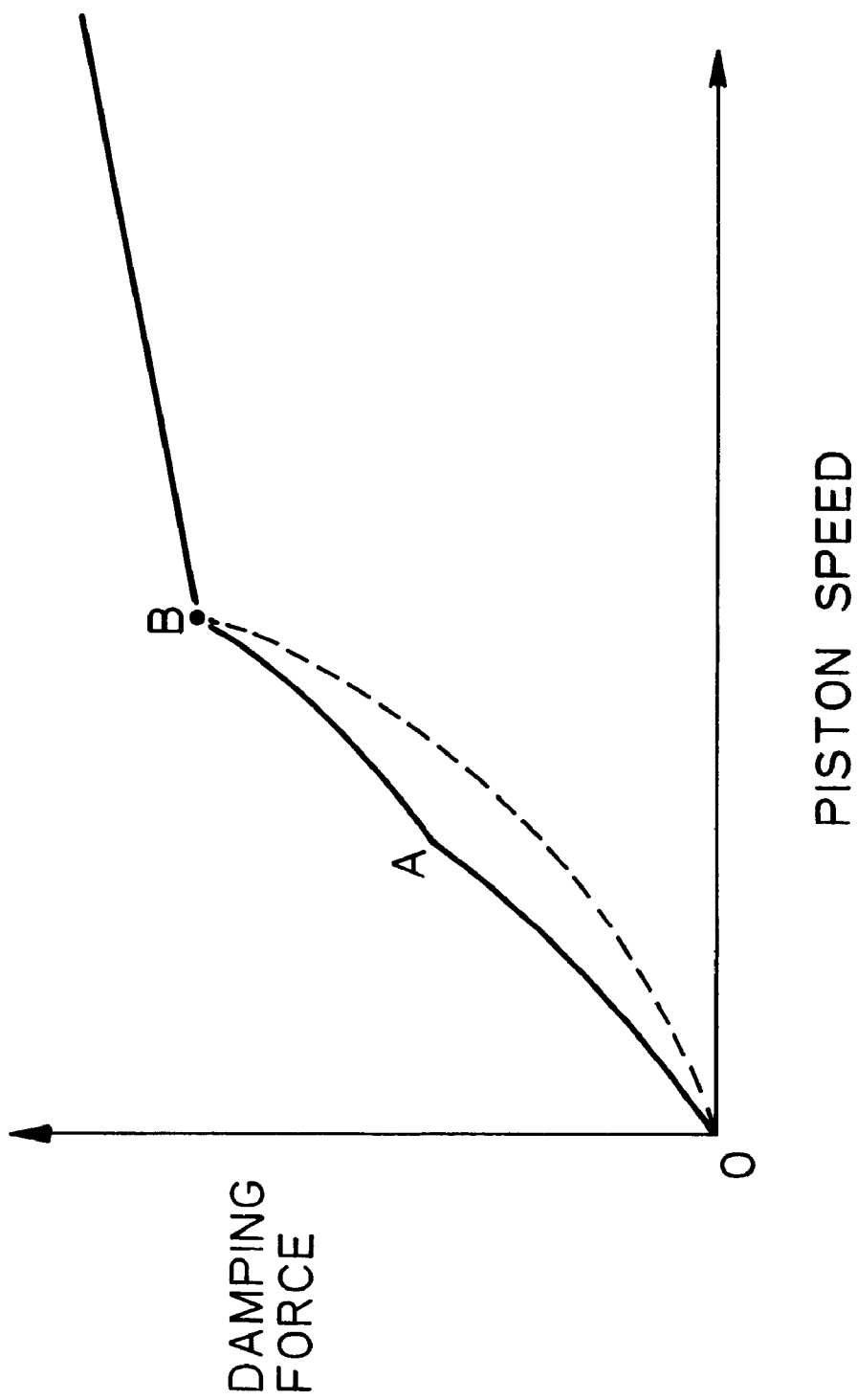
FIG. 9 is a graph showing damping force characteristics of the damping force control type hydraulic shock absorber according to the fourth embodiment of the present invention.

Accordingly, the damping force characteristics are as shown by the solid line in the graph of FIG. 9. That is, when the piston speed is lower than the valve opening point A at which the sub-disk valves 78 and 79 open, damping force of orifice characteristics is generated by the orifice passages formed by the cut portions 78a and 79a. After the sub-disk valves 78 and 79 have opened at the point A, damping force of valve characteristics is generated according to the degree of opening of the sub-disk valve 78 and 79. After the disk valves 46 and 47 have opened at the valve opening point B, damping force of valve characteristics is generated according to the degree of opening of the disk valves 46 and 47. Thus, a point of transit (valve opening point A) is set on the damping force characteristic curve in the low piston speed region by the sub-disk valves 78 and 79, thereby properly correcting the damping force characteristics in the low piston speed region. This also makes it possible to ensure damping force in the extremely low piston speed region satisfactorily. It should be noted that the dashed-line curve in the graph of FIG. 9 represents the damping force characteristics of the first to third embodiments, which have no sub-disk valves.

Dimensions of essential parts of the damping force generating mechanisms 24, 71, 72 and 75 according to the foregoing embodiments will be explained below with reference to FIG. 4 as a representative drawing. Assuming that the diameter $D_1$ of the annular valve seats 38 and 39 is 28.7 mm, for example, it is preferable from the viewpoint of optimization that the inner diameter $D_2$ of the seal disks 54 and 55 be of the order of 24.0 to 26.0 mm; the outer diameter $D_3$ of the valve springs (spring means) 56 and 57 be of the order of 26.0 to 30.0 mm; the inner diameter $D_4$ of the outer seal portions 40 and 41 be of the order of 31.0 to 33.0 mm; and the height difference H between the valve seats 38 and 39 and the outer seal portions 40 and 41 be of the order of 0.2 to 0.5 mm. An experiment revealed that these numerical values ($D_2$, $D_3$ and $D_4$) are in proportional relation to each other.

Next, a fifth embodiment of the present invention will be described with reference to FIGS. 10 to 13. It should be noted that the structure of a damping force control type hydraulic shock absorber according to the fifth embodiment is approximately similar to that in the first embodiment, shown in FIG. 1, with regard to the cylinder part and the reservoir. Therefore, in FIGS. 10 to 12, the same members or portions as those shown in FIG. 1 are denoted by the same reference numerals, and only portions in which the fifth embodiment differs from the first embodiment will be described below in detail.

Figure 10:
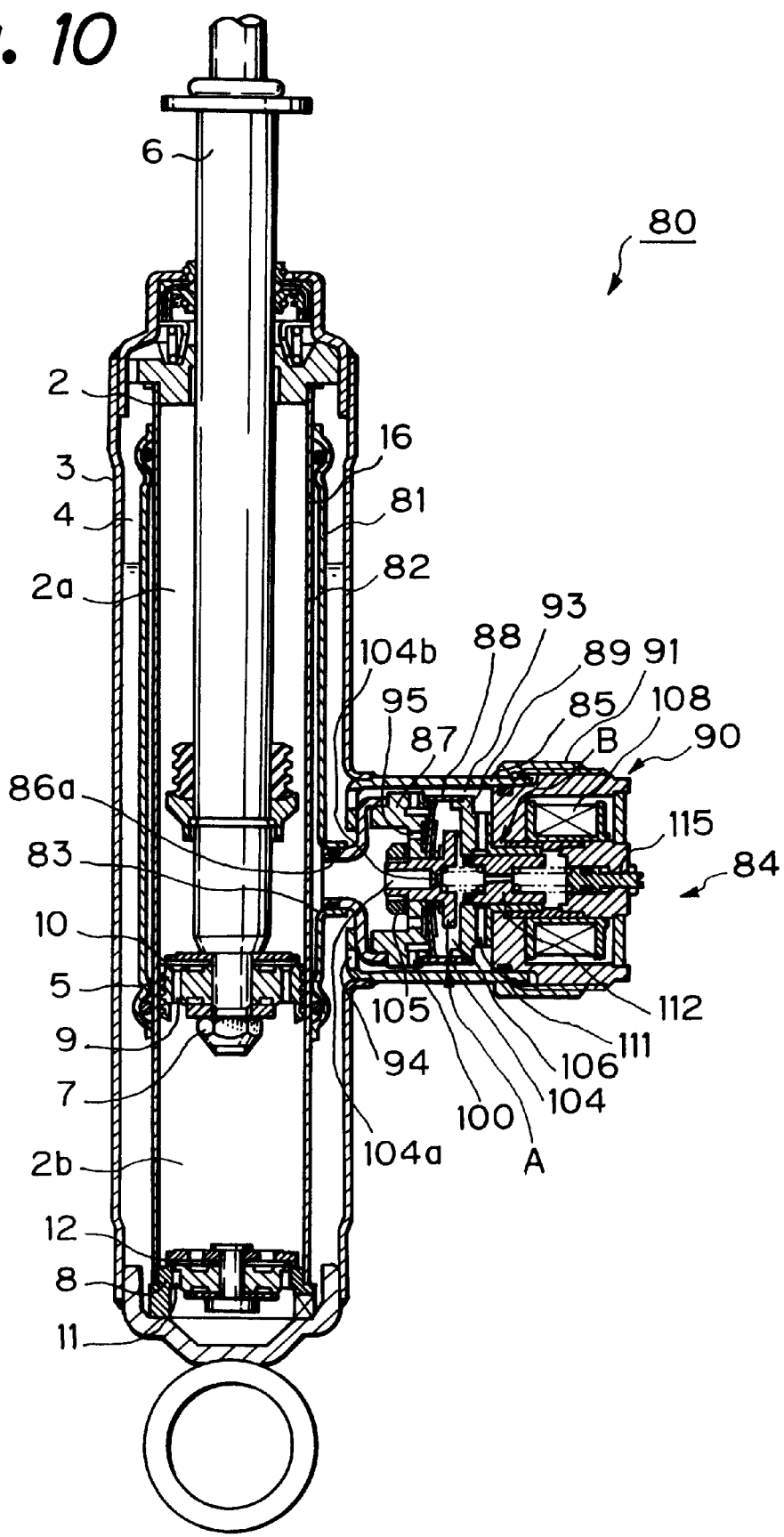
FIG. 10 is a vertical sectional view of a damping force control type hydraulic shock absorber according to a fifth embodiment of the present invention.
Figure 11:
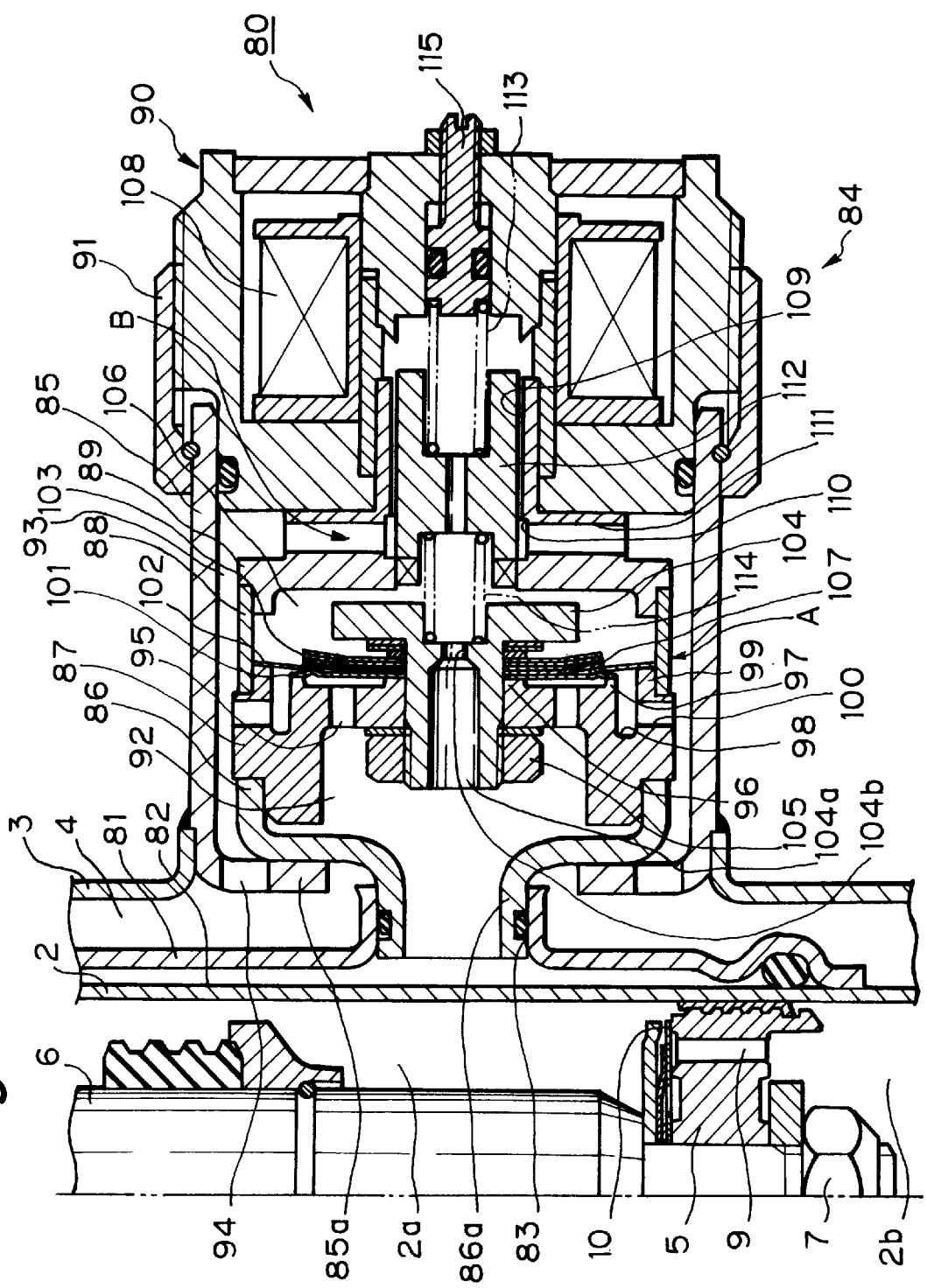
FIG. 11 is a vertical sectional view showing an essential part of the shock absorber in FIG. 10.
Figure 12:
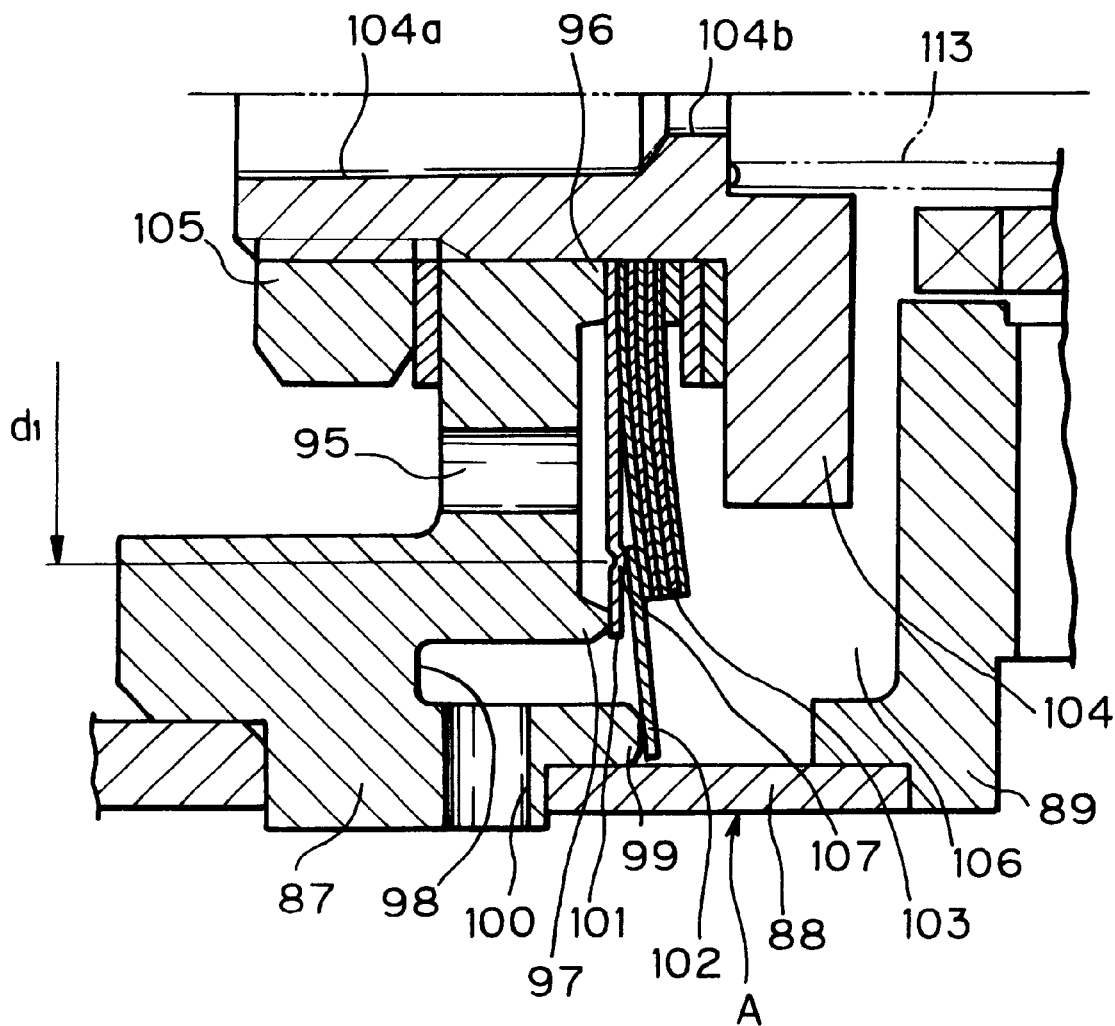
FIG. 12 is an enlarged view showing a main damping valve of the shock absorber in FIG. 10.

As shown in FIGS. 10 to 12, in the damping force control type hydraulic shock absorber 80 according to the fifth embodiment, a tube 81 is fitted on the cylinder 2 to form an annular passage 82 between the cylinder 2 and the tube 81. The annular passage 82 is communicated with the cylinder upper chamber 2a through the hydraulic fluid passage 16, which is provided in the side wall of the cylinder 2 near the upper end of the cylinder 2. Further, an opening 83 is provided in the side wall of the tube 81. It should be noted that the damping force control type hydraulic shock absorber 80 is not provided with the hydraulic fluid passage 19 as provided in the cylinder 2 shown in FIG. 1.

A damping force generating mechanism 84 is mounted on the side of the outer cylinder 3. The damping force generating mechanism 84 has a cylindrical casing 85 with a flange 85a at one open end thereof. The open end portion of the damping force generating mechanism 84 is welded to the side wall of the outer cylinder 3. In the casing 85, a passage member 86, a valve member body 87, a cylindrical member 88, and a guide member 89 (seal member) are inserted in the mentioned order from the flange (85a) side in such a manner that these member abut on one another. A proportional solenoid actuator 90 is fitted into the other open end portion of the casing 85 and secured by screwing into a retainer 91. By setting the proportional solenoid 90 to abut on the guide member 89, the members in the casing, i.e. the passage member 86, the valve member body 87, the cylindrical member 88, and the guide member 89, are secured.

The passage member 86 has a small-diameter opening portion 86a at one end thereof. The small-diameter opening portion 86a is fitted into the opening 83 of the tube 81, and thus a hydraulic fluid chamber 92 formed in the passage member 86 is communicated with the annular passage 82. An annular hydraulic fluid passage 93 is formed between the passage member 86 and the cylindrical member 88 on the one hand and the casing 85 on the other. The annular hydraulic fluid passage 93 is communicated with the reservoir chamber 4 through a hydraulic fluid passage 94 provided in the flange 85a of the casing 85.

The valve member body 87 is an approximately disk-shaped member, which is connected with the cylindrical member 88 to form a valve member in the shape of a cylinder, one end of which is closed. The bottom of the valve member, that is, the valve member body 87, is provided with a plurality (only two of them are shown) of circumferentially spaced, axially extending hydraulic fluid passages 95. An annular inner seal portion 96 projects from one end portion of the valve member body 87 at a position radially inward of the hydraulic fluid passages 95. An annular valve seat 97 projects from the end portion of the valve member body 87 at a position radially outward of the hydraulic fluid passages 95. An annular groove 98 (groove) is formed in the end portion of the valve member body 87 at a position radially outward of the valve seat 97. Moreover, an annular outer seal portion 99 projected from the end portion of the valve member body 87 at a position radially outward of the annular groove 98. The outer peripheral portion of the outer seal portion 99 is in contact with the side wall of the valve member, that is, the inner peripheral surface of the cylindrical member 88. The annular groove 98 is communicated with the annular hydraulic fluid passage 93 through a hydraulic fluid passage 100.

The valve member body 87 is provided with a disk valve 101 which is secured at an inner peripheral portion thereof to the inner seal portion 96, with its outer peripheral portion resting on the valve seat 97. An annular seal disk 102 is provided such that an inner peripheral portion thereof abuts on the back of the disk valve 101, and an outer peripheral portion thereof abuts on the outer seal portion 99. A disk-shaped valve spring 103 (spring means) is secured at an inner peripheral portion thereof to the valve member body 87. The valve spring 103 abuts at an outer peripheral portion thereof on the inner peripheral portion of the seal disk 102, thereby pressing the seal disk 102 toward the disk valve 101 and the outer seal portion 99. Both the disk valve 101 and the valve spring 103 are secured to the valve member body 87 by screwing a nut 105 onto a pin 104 inserted into an opening provided in the center of the valve member body 87.

An annular projection 107 is formed on the back of the disk valve 101 along the circumference thereof. The inner peripheral portion of the seal disk 102 abuts on the distal end of the projection 107.

The disk valve 101, the seal disk 102, the cylindrical member 88, and the guide member 89 define a pilot chamber 106. The pilot chamber 106 is communicated with the hydraulic fluid chamber 92 by a hydraulic fluid passage 104*a* (upstream passage) provided in the pin 104 through a fixed orifice 104*b*.

The valve member body 87, the disk valve 101, the seal disk 102, and the pilot chamber 106 constitute a main damping valve A (pilot-type main damping valve). In the main damping valve A, the disk valve 101 opens upon receiving the pressure of hydraulic fluid from the hydraulic fluid passages 95, and generates damping force according to the degree of opening of the disk valve 101. The valve opening pressure of the disk valve 101, i.e. the main damping valve A, is controlled by using the pressure in the pilot chamber 106 as a pilot pressure acting in the direction for closing the disk valve 101.

The guide member 89 is provided with a bore 109 facing opposite to a solenoid 108 of the proportional solenoid actuator 90 and communicating with the pilot chamber 106. An annular groove 110 is formed in the inner peripheral surface of the bore 109. The annular groove 110 is communicated with the annular hydraulic fluid passage 93 through a hydraulic fluid passage 111 (downstream passage). The bore 109 is slidably fitted with a spool 112. The bore 109 and the spool 112 constitute a flow control valve B (variable orifice). The spool 112 moves according to an electric current supplied to the solenoid 108 of the proportional solenoid actuator 90 against biasing force from springs 113 and 114 to open and close the annular groove 110, thereby controlling the flow path area of a passage formed between the bore 109 and the hydraulic fluid passage 111. The proportional solenoid actuator 90 is provided with an adjusting screw 115 for controlling the initial load applied from the spring 113 to the spool 112.

In the above-described arrangement, the hydraulic fluid passage 16, the annular passage 82, the small-diameter opening portion 86*a*, the hydraulic fluid chamber 92, the hydraulic fluid passages 95, the annular groove 98, the hydraulic fluid passage 100, the annular hydraulic fluid passage 93, and the hydraulic fluid passage 94 constitute a main passage for communication between the cylinder upper chamber 2*a* and the reservoir chamber 4.

The operation of this embodiment, arranged as described above, will be described below.

During the extension stroke of the piston rod 6, as the piston 5 moves, the check valve of the piston 5 is closed, and the hydraulic fluid in the cylinder upper chamber 2*a* is pressurized. Consequently, the hydraulic fluid flows to the hydraulic fluid chamber 92 of the damping force generating mechanism 84 through the hydraulic fluid passage 16, the annular passage 82, and the small-diameter opening portion 86*a*, and further flows to the reservoir chamber 4 through the hydraulic fluid passage 104*a*, the fixed orifice 104*b*, the pilot chamber 106, the bore 109, the annular groove 110, the hydraulic fluid passage 111, the annular hydraulic fluid passage 93, and the hydraulic fluid passage 94. When the pressure on the cylinder upper chamber side reaches the valve opening pressure of the main damping valve A during the extension stroke, the main damping valve A opens, and the hydraulic fluid flows from the hydraulic fluid chamber 92 to the annular hydraulic fluid passage 93 through the hydraulic fluid passages 95, the annular groove 98, and the hydraulic fluid passage 100. Meanwhile, an amount of hydraulic fluid corresponding to an amount by which the piston 3 moves flows from the reservoir chamber 4 to the cylinder lower chamber 2*b* while opening the check valve 12 of the base valve 8.

When the piston speed is low before the main damping valve A opens, damping force is generated according to the flow path area of the fixed orifice 104*b* and flow control valve B. As the piston speed increases, the pressure in the cylinder upper chamber 2*a* rises, and eventually the main damping valve A opens. After the main damping valve A has opened, damping force is generated according to the degree of opening of the main damping valve A. At this time, as the flow path area of the flow control valve B reduces, the pressure loss increases, and the pressure in the pilot chamber 106, which is upstream the flow control valve B, becomes higher. Consequently, the pilot pressure of the main damping valve A becomes higher. Because the pilot pressure acts in the direction for closing the disk valve 101, the valve opening pressure of the main damping valve A becomes higher. Accordingly, by changing the flow path area of the flow control valve B with an electric current supplied to the solenoid 108, the orifice characteristics can be directly controlled, and the pressure in the pilot chamber 106 is also changed, causing the valve opening pressure of the main damping valve A to change. Thus, the valve characteristics can be controlled. Therefore, damping force characteristics can be controlled over a wide piston speed range, from a low piston speed region to a high piston speed region.

During the contraction stroke of the piston rod 6, as the piston 5 moves, the check valve 12 of the base valve 8 is closed. Consequently, the hydraulic fluid in the cylinder lower chamber 2*b* opens the check valve 10 of the piston 5 and flows into the cylinder upper chamber 2*a*, and an amount of hydraulic fluid corresponding to an amount by which the piston rod 6 enters the cylinder 2 flows from the cylinder upper chamber side to the reservoir side through a flow path similar to that during the extension stroke.

Accordingly, damping force is generated as in the case of the extension stroke. That is, when the piston speed is low before the main damping valve A opens, damping force of orifice characteristics is generated according to the flow path area of the fixed orifice 104*b* and flow control valve B. As the piston speed increases, the pressure on the cylinder upper chamber side rises, and eventually the main damping valve A opens. After the main damping valve A has opened, damping force of valve characteristics is generated according to the degree of opening of the main damping valve A. Thus, an excessive increase of damping force is suppressed.

By changing the flow path area of the flow control valve B with an electric current supplied to the solenoid 108, the orifice characteristics can be directly controlled, and the valve characteristics can also be controlled through the resulting change of the pressure in the pilot chamber 106. Thus, damping force characteristics can be controlled over a wide piston speed range, from a low piston speed region to a high piston speed region. It should be noted that, during the contraction stroke, the pressure-receiving area of the piston rod 6 acts as an effective piston area, and it is smaller than during the extension stroke; therefore, damping force is correspondingly smaller than during the extension stroke.

The fifth embodiment provides advantageous effects similar to those in the first to fourth embodiments. That is, because the pilot chamber 106 is formed without providing a sliding portion, it is possible to minimize the leakage of hydraulic fluid from the pilot chamber 106 and hence possible to obtain stable damping force characteristics. Moreover, it is possible to minimize variations in damping force with temperature changes. Further, there is no need of machining a sliding portion, which requires high machining accuracy. Accordingly, the production cost can be reduced. Further, because the inner seal portion 96, the valve seat 97, and the outer seal portion 99 can be integrally formed with the valve member body 87, it is possible to reduce errors in the height of these portions, and hence possible to minimize variations in the valve opening pressure of the disk valve 101.

Figure 13:
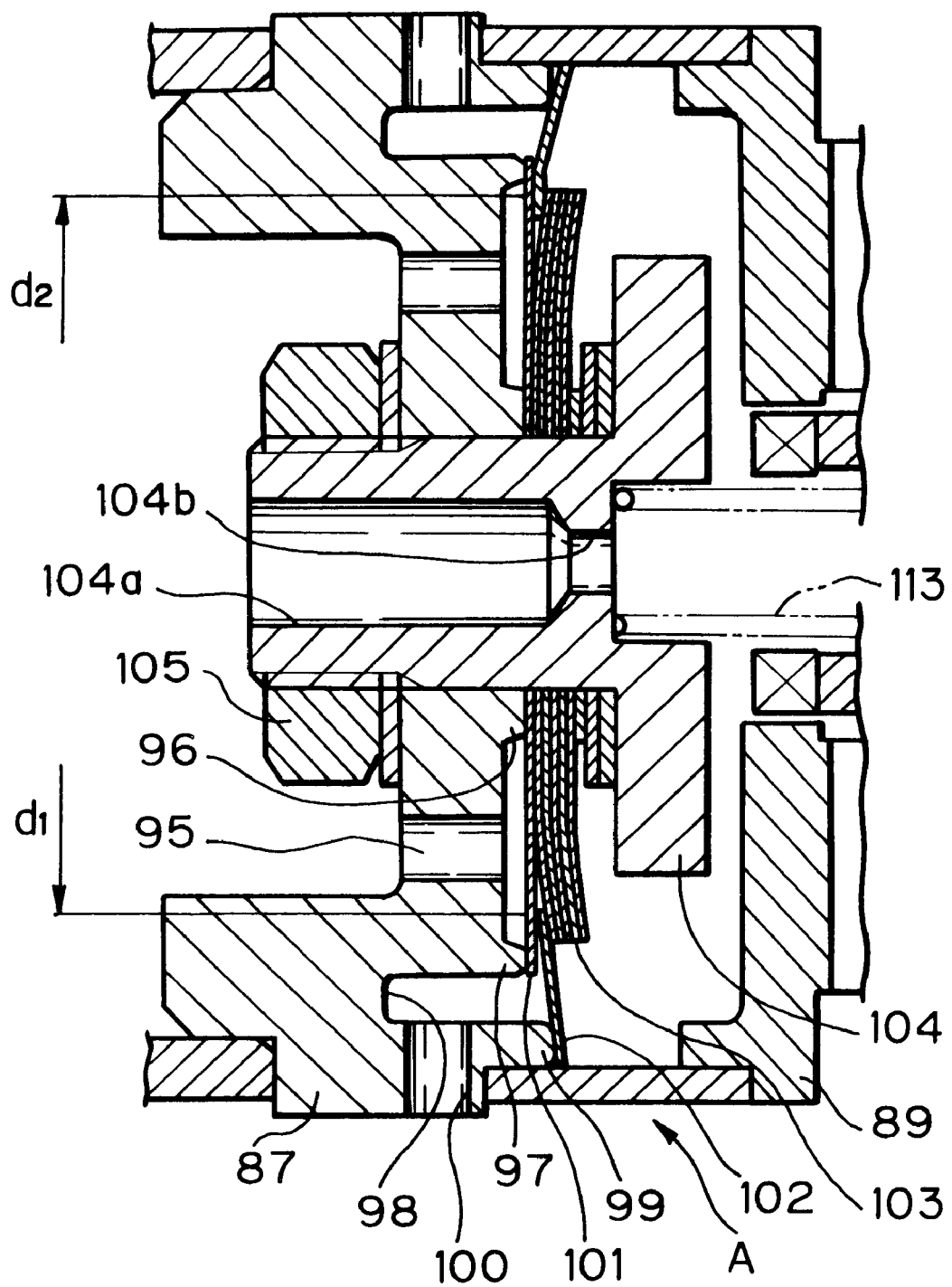
FIG. 13 shows deformation of a disk valve and a seal disk by the pressure in a pilot chamber in a case where no projection is provided on the disk valve in the main damping valve in FIG. 12.

If the disk valve 101 is not provided with a projection 107, as shown in FIG. 13, the diameter of the abutment between the seal disk 102 and the disk valve 101 is $d_1$ (see the lower part of FIG. 13) in a normal state, but it becomes $d_2$ (see the upper part of FIG. 13), which is larger than the diameter $d_1$ in the normal state, when the disk valve 101 and the seal disk 102 are deflected toward the valve member body 87 by a rise of the pressure in the pilot chamber 106. Accordingly, the disk valve 101 is pressed in the valve closing direction at a portion thereof which is closer to the outer periphery than in the normal state. As a result, the pressure-receiving area of the disk valve 101 for the pressure in the pilot chamber 106 increases, and this makes the disk valve 101 correspondingly difficult to open. Thus, there are variations in the valve opening pressure of the disk valve 101 due to the deflection of the disk valve 101 and the seal disk 102 caused by the pressure in the pilot chamber 106, and it is difficult to obtain stable damping force.

In contrast, this embodiment enables stable damping force to be obtained. That is, in the main damping valve A, the inner peripheral portion of the seal disk 102 abuts on the distal end of the annular projection 107 provided on the back of the disk valve 101. Therefore, even when the disk valve 101 and the seal disk 102 are deflected toward the valve member body 87 by a rise of the pressure in the pilot chamber 106, the diameter $d_1$ (see FIG. 12) of the abutment between the seal disk 102 and the disk valve 101, i.e. the distal end of the projection 107, remains constant without change. Accordingly, it is possible to prevent variation in the valve opening pressure of the disk valve 101 with respect to the pressure in the pilot chamber 106 and to obtain stable damping force.

It should be noted that the projection 107 in the fifth embodiment may be provided on the disk valves 46 and 47 in the first to fourth embodiments.

Although in the fifth embodiment the disk valve 101 comprises a single disk, it should be noted that the present invention is not necessarily limited to it, and that the disk valve 101 may comprise a plurality of disks, and the projection 107 may be provided only a disk facing the seal disk 102. If the disk valve 101 is formed by using a plurality of disks, the thickness of each disk can be reduced, and working for forming the projection 107 is facilitated. Further, if a disk with a cut portion in its outer periphery is used as a disk facing the valve seat 97, an orifice can be formed.

Next, a sixth embodiment of the present invention will be described with reference to FIG. 14. It should be noted that the arrangement of the sixth embodiment is approximately similar to that of the second embodiment except that a retainer disk is interposed between a disk valve and a seal disk which constitute a main damping valve of a damping force generating mechanism. Therefore, only a part including the main damping valve and pilot chamber is illustrated in FIG. 14, in which the same members or portions as those shown in FIGS. 3 and 4 are denoted by the same reference numerals, and only portions in which the sixth embodiment differs from the second embodiment will be described below in detail.

Figure 14:
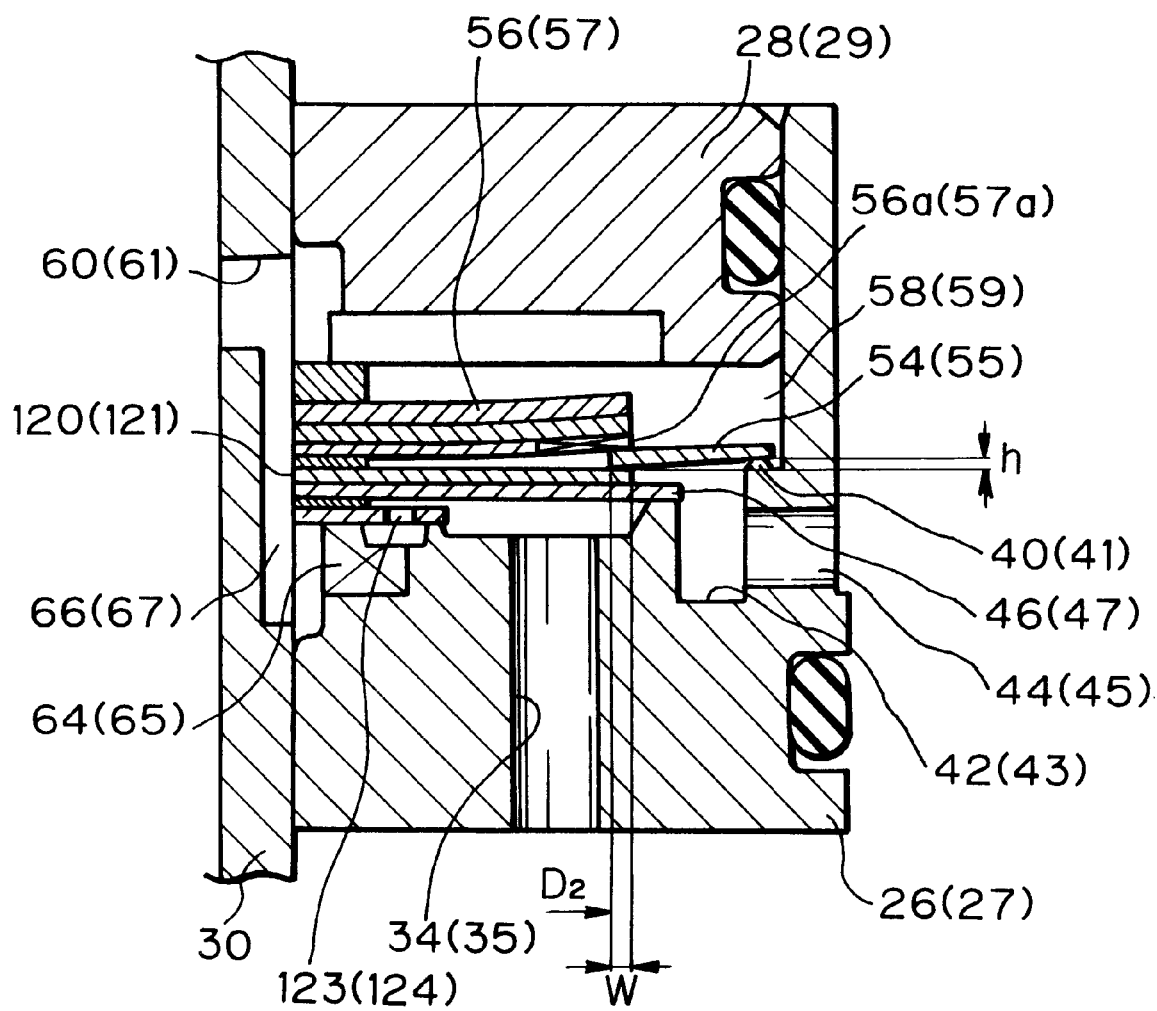
FIG. 14 is an enlarged vertical sectional view showing a part including a main damping valve and a pilot chamber in a damping force control type hydraulic shock absorber according to a sixth embodiment of the present invention.

As shown in FIG. 14, in a damping force control type hydraulic shock absorber according to the sixth embodiment, disk-shaped retainer disks 120 and 121 are stacked on the disk valves 46 and 47, respectively. The retainer disks 120 and 121 have a slightly smaller diameter than the disk valves 46 and 47. The retainer disks 120 and 121 are clamped at inner peripheral portions thereof together with the disk valves 46 and 47 so as to deflect together with the disk valves 46 and 47. The inner peripheral portions of the seal disks 54 and 55 abut on the outer peripheral portions of the retainer disks 120 and 121, respectively. In other words, the seal disks 54 and 55 are in contact with the disk valves 46 and 47 through the retainer disks 120 and 121, respectively.

The overlap width W of the abutting portions of the retainer disk 120 (121) and the seal disk 54 (55) is set at a sufficiently small value. The height difference h between the outer seal portion 40 (41) and the abutment between the retainer disk 120 (121) and the seal disk 54 (55) is set larger than the maximum lift of the disk valve 46 (47) so that the lower end portion at the inner peripheral edge of the seal disk 54 (55) constantly abuts on the upper surface of the retainer disk 120 (121).

It should be noted that, in the sixth embodiment, fixed orifices 123 and 124 in the upstream passages communicating with the pilot chambers 58 and 59 are provided separately from the cut portions 64 and 65.

The above-described arrangement provides the same function and advantageous effects as those in the second embodiment. In addition, the sixth embodiment provides the following advantages: The retainer disks 120 and 121 are interposed between the disk valves 46 and 47 and the seal disks 54 and 55, respectively, and the overlap width W of the abutting portions of the seal disk 54 (55) and the retainer disk 120 (121) is sufficiently small. Therefore, it is possible to minimize the change in the diameter $D_2$ of the abutment between the seal disk 54 (55) and the retainer disk 120 (121) even when the disk valve 46 (47), the retainer disk 120 (121), and the seal disk 54 (55) are deflected toward the bottom of the valve member 26 (27) by a rise of the pressure in the pilot chamber 58 (59), or the angle of contact between the seal disk 54 (55) and the retainer disk 120 (121) is reduced as the disk valve 46 (47) opens (lifts). As a result, it is possible to minimize variations in the valve opening pressure of the disk valve 46 (47) with respect to the pressure in the pilot chamber 58 (59) and to obtain a stable damping force as in the case of the fifth embodiment.

In this case, the retainer disks 120 and 121 are disk-shaped members and hence capable of being readily machined with the desired accuracy and obtaining a sufficient strength. Therefore, the production cost is reduced. Moreover, the damping force control type hydraulic shock absorber has minimal deterioration with time and high durability.

Next, a seventh embodiment of the present invention will be described with reference to FIG. 15. It should be noted that the arrangement of the seventh embodiment is approximately similar to that of the second embodiment except that a seat member is interposed between a disk valve and a seal disk which constitute a main damping valve of a damping force generating mechanism, and a seal ring is interposed between an outer seal portion and the seal disk. Therefore, only a part including the main damping valve and pilot chamber is shown in FIG. 15, in which the same members or portions as those shown in FIGS. 3 and 4 are denoted by the same reference numerals, and only portions in which the seventh embodiment differs from the second embodiment will be described below in detail.

Figure 15:
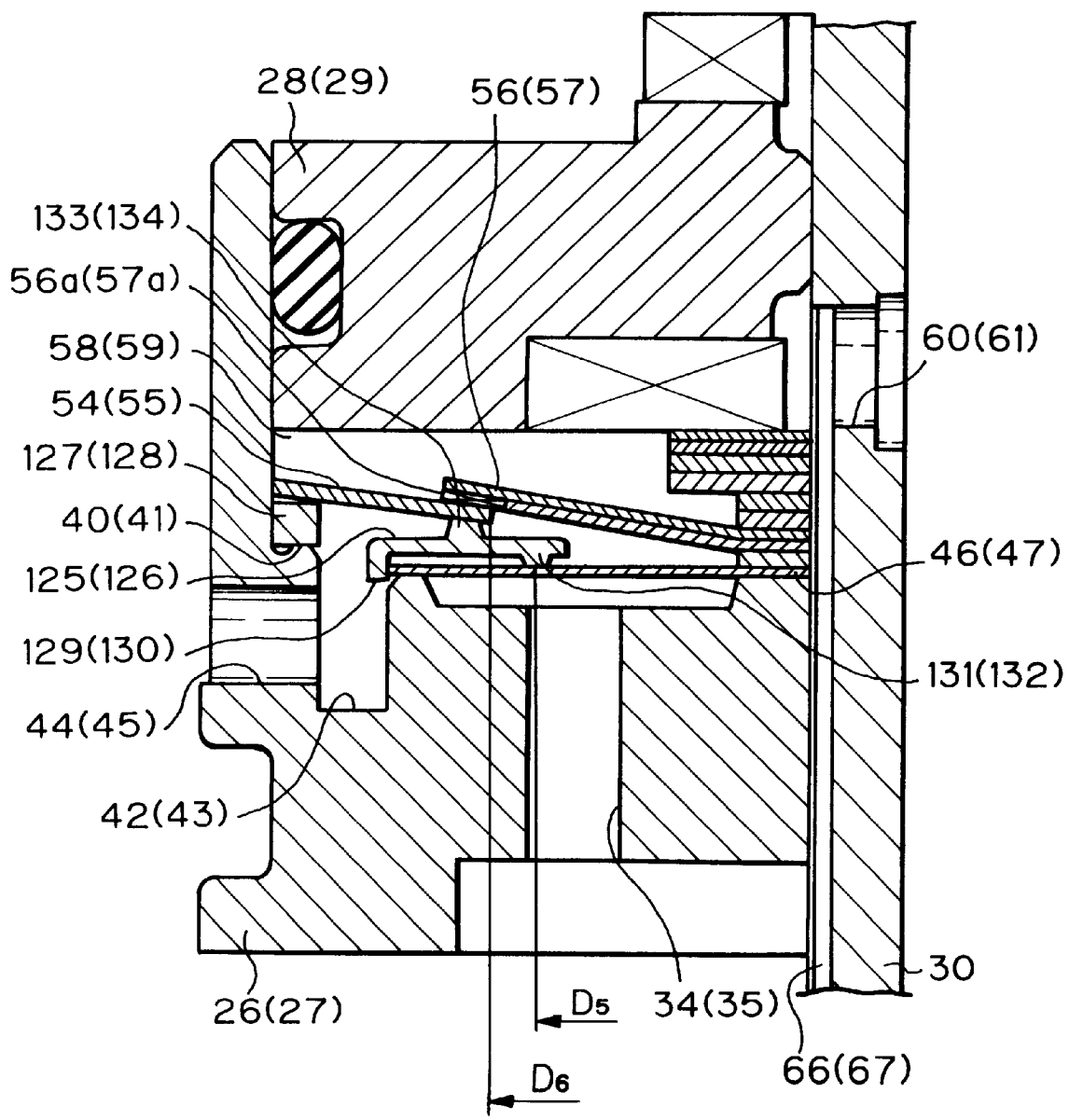
FIG. 15 is an enlarged vertical sectional view showing a part including a main damping valve and a pilot chamber in a damping force control type hydraulic shock absorber according to a seventh embodiment of the present invention.

As shown in FIG. 15, in a damping force control type hydraulic shock absorber according to the seventh embodiment, annular seat members 125 and 126 are interposed between the disk valves 46 and 47 and the seal disks 54 and 55, respectively, and seal rings 127 and 128 are interposed between the outer seal portions 40 and 41 and the seal disks 54 and 55, respectively.

Each seat member 125 (126) has an outer peripheral edge portion projecting downward to form an annular positioning projection 129 (130). An inner peripheral portion of the positioning projection 129 (130) is brought into contact with the outer peripheral surface of the disk valve 46 (47), thereby positioning the seat member 125 (126) on the disk valve 46 (47). An annular projection 131 (132) (first projection) is formed on the lower surface of the seat member 125 (126) at a position closer to the inner periphery. The projection 131 (132) abuts on the disk valve 46 (47). Further, an annular projection 133 (134) (second projection) is formed on the upper surface of the seat member 125 (126) at a position intermediate between the positioning projection 129 (130) and the projection 131 (132). The projection 133 (134) abuts on the seal disk 54 (55). In other words, the seal disks 54 and 55 are placed in contact with the disk valves 46 and 47 through the seat members 125 and 126, respectively.

The seal rings 127 and 128 are used for properly correcting the installation angles of the seal disks 54 and 55 by raising the outer peripheral portions of the seal disks 54 and 55, whose inner peripheral portions are raised by the provision of the seat members 125 and 126. Therefore, the seal rings 127 and 128 may be omitted by setting the heights of the outer seal portions 40 and 41 in conformity to the seat members 125 and 126, that is, by integrally forming seal rings with the outer seal portions.

The above-described arrangement provides the same function and advantageous effects as those in the second embodiment. Moreover, in the seventh embodiment, the seal disks 54 and 55 are placed in contact with the disk valves 46 and 47 through the projections 131 and 132 of the seat members 125 and 126, respectively. Therefore, the diameter $D_5$ of the abutment between the seal disk 54 (55) and the seat member 125 (126), i.e. the distal end of the projection 131 (132), remains constant without change even when the disk valve 46 (47) and the seal disk 54 (55) are deflected toward the bottom of the valve member 26 (27) by a rise of the pressure in the pilot chamber 58 (59). As a result, it is possible to minimize variations in the valve opening pressure of the disk valve 46 (47) with respect to the pressure in the pilot chamber 58 (59) and to obtain stable damping force as in the case of the fifth embodiment.

In addition, the projection 131 (132) (diameter $D_5$) of the seat member 125 (126) enables the pressure in the pilot chamber 58 (59) to act on a portion of the disk valve 46 (47) which is closer to the inner periphery than the inner peripheral edge (diameter $D_6$) of the seal disk 54 (55). Moreover, the seat member 125 (126) moves parallel in the axial direction thereof when the disk valve 46 (47) opens (lifts). Therefore, when the disk valve 46 (47) opens (lifts), there is no possibility that the outer peripheral portion of the disk valve 46 (47) will abut on the central portion of the seal disk 54 (55) and lift the seal disk 54 (55) from the outer seal portion 40 (41) [seal ring 127 (128)]. Accordingly, the valve opening pressure of the disk valve 46 (47) with respect to the pressure in the pilot chamber 58 (59) can be set at a relatively low level. Thus, it is possible to increase the degree of freedom for setting damping force characteristics.

If the arrangement is such that the inner peripheral edge portion of the seal disk 54 (55) abuts directly on a portion of the disk valve 46 (47) which is closer to the inner periphery, when the disk valve 46 (47) opens (lifts), the outer peripheral portion of the disk valve 46 (47) will abut on the central portion of the seal disk 54 (55) and lift the seal disk 54 (55) from the outer seal portion 40 (41) [seal ring 127 (128)], causing the pilot chamber 58 (59) and the downstream side of the main passage to communicate with each other, which results in a rapid drop of the pilot pressure and hence a rapid reduction of the damping force.

Next, an eighth embodiment of the present invention will be described with reference to FIG. 16. It should be noted that the arrangement of the eighth embodiment is approximately similar to that of the fifth embodiment except that a retainer ring is interposed between an outer seal portion and a seal ring which constitute a main damping valve of a damping force generating mechanism. Therefore, only a part including the main damping valve and pilot chamber is illustrated in FIG. 16, in which the same members or portions as those shown in FIGS. 10 to 12 are denoted by the same reference numerals, and only portions in which the eighth embodiment differs from the fifth embodiment will be described below in detail.

Figure 16:
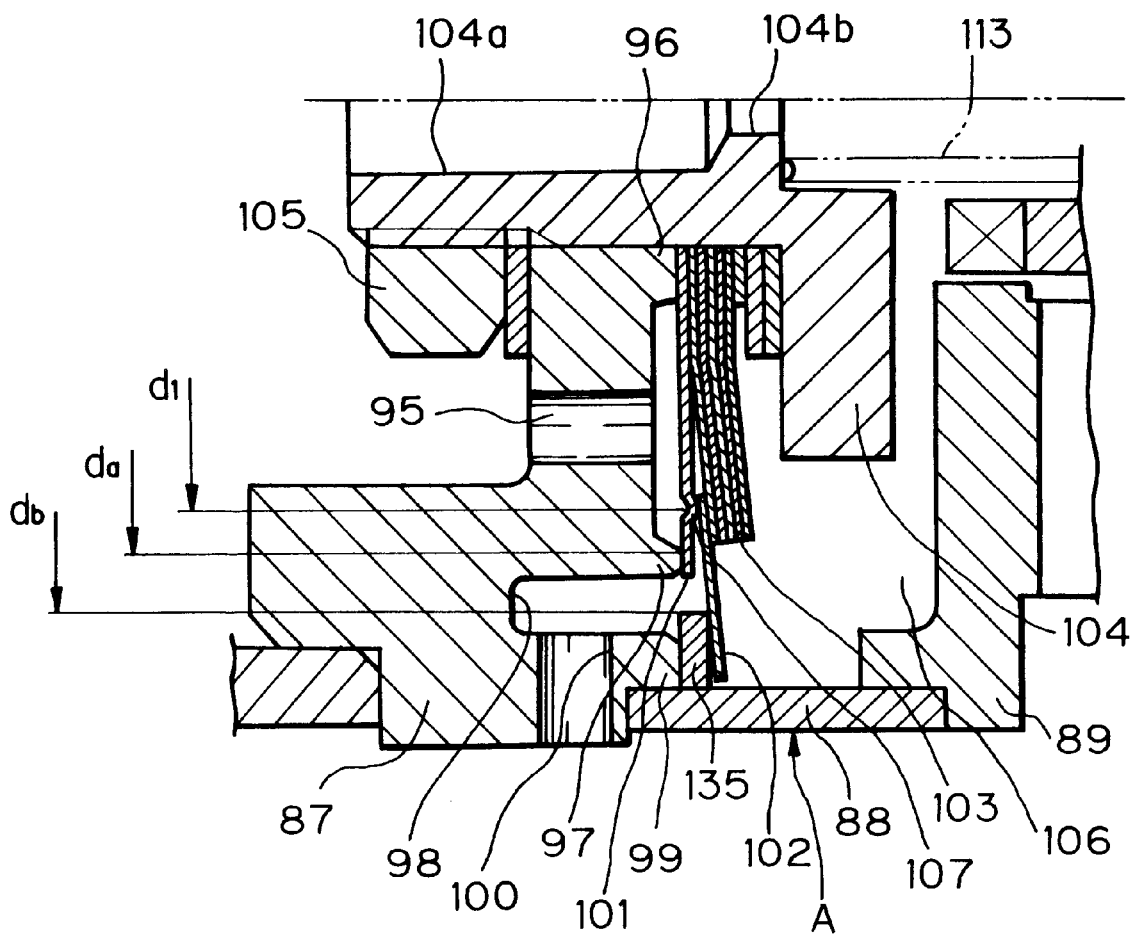
FIG. 16 is an enlarged vertical sectional view showing a part including a main damping valve and a pilot chamber in a damping force control type hydraulic shock absorber according to an eighth embodiment of the present invention.

As shown in FIG. 16, in a damping force control type hydraulic shock absorber according to the eighth embodiment, an annular retainer ring 135 is interposed between an outer seal portion 99 and a seal disk 102. The retainer ring 135 has an outer peripheral portion fitted to the cylindrical member 88 and is arranged such that the ratio of the inner diameter $d_b$ (i.e. the diameter of the inner line of contact between the retainer ring 135 and the seal disk 102) to the inner diameter $d_a$ of the valve seat 97 of the disk valve 101 (i.e. the diameter of the inner line of contact between the valve seat 97 and the disk valve 101) is $d_b/d_a \leq 1.2$.

With the above-described arrangement, the retainer ring 135 enables the pressure-receiving area of the seal disk 102 to be practically reduced to a moderate extent, and the pilot pressure acting on the disk valve 101 is rationalized. Thus, "hard" damping force characteristics can be optimized.

Although in the eighth embodiment the inner diameter $d_b$ of the outer seal portion is set by the retainer ring 135, which is a separate member, it should be noted that the retainer ring 135 may be integrally formed with the outer seal portion 99. In the first to seventh embodiments also, "hard" damping force characteristics can be optimized by setting the ratio of the inner diameter $D_4$ of the outer seal portion to the inner diameter $D_1$ of the valve seat of the disk valve constituting the main damping valve to be $D_4/D_1 \leq 1.2$ (see FIG. 4) as in the case of the eighth embodiment.

What is claimed is:

1. An improved damping force control type hydraulic shock absorber comprising:

a cylinder having a hydraulic fluid sealed therein;

a piston slid ably fitted in said cylinder;

a,piston rod having a first end connected to said piston, and a second end located exteriorly of said cylinder;

a main passage allowing the hydraulic fluid to flow therethrough in response to sliding motion of said piston;

a main damping valve provided in said main passage for controlling a flow path area of said main passage, said main damping valve having a valve body;

a pilot chamber provided at a back of said valve body of said main damping valve body for applying a pressure in said pilot chamber in a direction for closing said valve body;

an upstream passage providing communication between said pilot chamber and a part of said main passage which is upstream of said main damping valve;

a fixed orifice provided in said upstream passage;

a downstream passage providing communication between said pilot chamber and a part of said main passage which is downstream of said main damping valve; and a variable orifice provided in said downstream passage to control a flow path area of said downstream passage;

the improvement comprising:

a valve member having the shape of a cylinder, said valve member having one end which is closed;

a hydraulic fluid passage extending in an axial direction through a bottom of said valve member;

an annular inner seal portion projecting from an inner wall of said bottom of said valve member at a position radially inward of said axially extending hydraulic fluid passage;

an annular valve seat projecting from said inner wall of said bottom of said valve member at a position radially outward of said axially extending hydraulic fluid passage;

an annular outer seal portion projecting from said inner wall of said bottom of said valve member at a position radially outward of said annular valve seat;

a groove provided in said inner wall of said bottom of said valve member between said annular valve seat and said annular outer seal portion;

a disk valve having an inner peripheral portion secured to said annular inner seal portion, and an outer peripheral portion abutting said valve seat, wherein said annular outer seal portion is disposed radially outwardly of the outer perimeter of said disc valve;

an annular seal disk having an inner peripheral portion abutting a surface of said disk valve, and an outer peripheral portion abutting said annular outer seal portion;

spring means for pressing said seal disk against said disk valve and said annular outer seal portion; and a seal member fitted in an open end portion of said valve member, wherein:

said axially extending hydraulic fluid passage and said groove constitute said main passage;

said disk valve constitutes said valve body of said main damping valve; and a side wall of said valve member, said disk valve, said seal disk, and said seal member define said pilot chamber.

2. A damping force control type hydraulic shock absorber according to claim 1, further comprising:

a sub-damping valve which opens upon receiving a pressure of hydraulic fluid flowing toward said fixed orifice to generate damping force of valve characteristics according to a degree of opening of said sub-damping valve.

3. A damping force control type hydraulic shock absorber according to claim 2, wherein said disk valve has an annular projection provided on a back thereof along circumference thereof, and the inner peripheral portion of said seal disk abuts on said projection.

4. A damping force control type hydraulic shock absorber according to claim 2, further comprising:

a disk-shaped retainer disk interposed between said disk valve and said seal disk, said retainer disk having a slightly smaller diameter than said disk valve, so that the inner peripheral portion of said seal disk abuts on a portion of said retainer disk near an outer peripheral edge of said retainer disk.

5. A damping force control type hydraulic shock absorber according to claim 2, further comprising:

an annular seat member interposed between said disk valve and said seal disk, said seat member having a positioning projection formed on an outer peripheral portion thereof, said positioning projection abutting on an outer peripheral surface of said disk valve, said seat member having annular first projection formed on one side thereof, said first projection abutting on said disc valve, and said seat member having a second projection formed on the other side thereof, said second projection abutting on said seal disk.

6. A damping force control type hydraulic shock absorber according to claim 2, wherein a ratio of an inner diameter $d_b$ of said outer seal portion to an inner diameter $d_a$ of said valve seat of said disk valve is $d_b/d_a \leq 1.2$.

7. A damping force control type hydraulic shock absorber according to any one of claims 1, wherein said disk valve has an annular projection provided on a back thereof along a circumference thereof, and the inner peripheral portion of said seal disk abuts on said projection.

8. A damping force control type hydraulic shock absorber according to claim wherein a ration of an inner diameter db of said outer seal portion to an inner diameter $d_a$ of said valve seat of said disk valve is $d_b/d_a \leq 1.2$.

9. A damping force control type hydraulic shock absorber according to claim 1, further comprising:

an annular seat member interposed between said disk valve and said seal disk, said seat member having a positioning projection formed on an outer peripheral portion thereof, said positioning projection abutting on an outer peripheral surface of said disk valve, said seat member having an annular first projection formed on one side thereof, said first projection abutting on said disk valve, and said seat member having a second projection formed on the other side thereof, said second projection abutting on said seal disk.

10. A damping force control type hydraulic shock absorber according to claim 9, wherein a ratio of an inner diameter $d_b$ of said outer seal portion to an inner diameter da of said valve seat of said disk valve is $d_b/d_a \leq 1.2$.

11. A damping force control type hydraulic shock absorber according to any one-of claim 1, wherein a ratio of an inner diameter $d_b$ of said outer seal portion to an inner diameter $d_a$ of said valve seat of said disk valve is $d_b/d_a \leq 1.2$.

12. A damping force control type hydraulic shock absorber as claimed in claim t further comprising a disk-shaped retainer disk interposed between said disk valve and said annular seal disk, said retainer disk having a diameter which is slightly smaller than a diameter of said disk valve, so that said inner peripheral portion of said annular seal disk abuts a portion of said retainer disk near an outer peripheral edge of said retainer disk.

13. A damping force control type hydraulic shock absorber according to claim 12, further comprising:

an annular seat member interposed between said disk valve and said seal disk, said seat member having a positioning projection formed on an outer peripheral portion thereof, said positioning projection-abutting on an outer peripheral surface of said disk valve, and said seat member having a second projection formed on the other side thereof, said second projection abutting on said seal disk.

14. A damping force control type hydraulic shock absorber according to claim 12, wherein a ratio of an inner diameter $d_b$ of said outer seal portion to an inner diameter da of said valve seat of said disk valve is $d_b/d_a \leq 1.2$.

15. A damping force control type hydraulic shock absorber as claimed in claim 1, wherein said spring means comprises a disk-shaped plate spring, said plate spring being provided with a hydraulic fluid passage for communicating between said pilot chamber and a space formed by said disk valve, said annular seal disk and said plate spring.

16. A damping force control type hydraulic shock absorber according to claim 15, further comprising:

a sub-damping valve which opens upon receiving a pressure of hydraulic fluid flowing toward said fixed orifice to generate damping force of valve characteristics according to a degree of opening of said sub-damping valve.

17. A damping force control type hydraulic shock absorber according to claim 15, wherein said disk valve has an annular projection provided on a back thereof along a circumference thereof, and the inner peripheral portion of said seal disk abuts on said projection.

18. A damping force control type hydraulic shock absorber according to claim 15, wherein a ratio of an inner edge of said retainer disk.

19. A damping force control type hydraulic shock absorber as claimed in claim 15, further comprising a disk-shaped retainer disk interposed between said disk valve and said annular seal disk, said retainer disk having a diameter which is slightly smaller than a diameter of said disk valve, so that said inner peripheral portion of said annular seal disk abuts a portion of said retainer disk near an outer peripheral edge of said retainer disk.

* * * * *